(12) United States Patent
Suzuki et al.

(10) Patent No.: US 12,302,789 B2
(45) Date of Patent: May 20, 2025

(54) COMBINE AND SELF-DRIVING METHOD

(71) Applicant: Yanmar Holdings Co., Ltd., Osaka (JP)

(72) Inventors: Hidetaka Suzuki, Osaka (JP); Yuji Yamaguchi, Osaka (JP); Yasuto Nishii, Osaka (JP); Masaaki Murayama, Okayama (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 180 days.

(21) Appl. No.: 18/039,955

(22) PCT Filed: Oct. 27, 2021

(86) PCT No.: PCT/JP2021/039601
§ 371 (c)(1),
(2) Date: Jun. 1, 2023

(87) PCT Pub. No.: WO2022/118571
PCT Pub. Date: Jun. 9, 2022

(65) Prior Publication Data
US 2024/0016089 A1    Jan. 18, 2024

(30) Foreign Application Priority Data
Dec. 2, 2020  (JP) ................. 2020-200124

(51) Int. Cl.
*A01D 41/12*    (2006.01)
*A01D 41/127*    (2006.01)
(Continued)

(52) U.S. Cl.
CPC ....... *A01D 41/1278* (2013.01); *G05D 1/0214* (2013.01)

(58) Field of Classification Search
CPC ............ A01D 41/1278; A01D 41/127; G05D 1/0214; G05D 1/0219; A01B 69/00
See application file for complete search history.

(56) References Cited

U.S. PATENT DOCUMENTS

2007/0135190 A1    6/2007   Diekhans et al.

FOREIGN PATENT DOCUMENTS

| EP | 3508045 A1 | 7/2019 |
|----|------------|--------|
| JP | 2015-170223 A | 9/2015 |

(Continued)

OTHER PUBLICATIONS

Extended European Search Report dated Oct. 7, 2024, issued in EP Application No. 21900326.6.

(Continued)

*Primary Examiner* — Rodney A Butler
(74) *Attorney, Agent, or Firm* — NORTON ROSE FULBRIGHT US LLP

(57) ABSTRACT

A combine is provided with a control device configured to function as a route generation unit, a position setting unit, a mid-work route generation unit, or a self-driving control unit. The route generation unit generates a travel route by combining a plurality of routes for an unreaped region in a field. To perform mid-work corresponding to the work amount of reaping traveling at a preset mid-work position, the position setting unit sets an interruption position at which automatic reaping traveling is interrupted to the end point of a predetermined interruption route based on the work amount. To perform the mid-work, the mid-work route generation unit generates a mid-work route extending from the interruption position to the mid-work position. The self-driving control unit controls traveling and reaping based on the travel or mid-work route.

16 Claims, 13 Drawing Sheets

(51) Int. Cl.
    *G05D 1/00*     (2006.01)
    *G05D 1/02*     (2020.01)

(56) References Cited

FOREIGN PATENT DOCUMENTS

| JP | 2015-181371 A | 10/2015 |
|---|---|---|
| JP | 2017-195804 A | 11/2017 |
| JP | 2018-068284 A | 5/2018 |
| JP | 2019-097454 A | 6/2019 |
| JP | 2019-110782 | 7/2019 |
| JP | 2020-022429 A | 2/2020 |

OTHER PUBLICATIONS

International Search Report dated Dec. 28, 2021 issued in corresponding PCT Application PCT/JP2021/039601.

COMBINE AND SELF-DRIVING METHOD

CROSS-REFERENCE TO RELATED APPLICATIONS

This application is a national stage application pursuant to 35 U.S.C. § 371 of International Application No. PCT/JP2021/039601, filed on Oct. 27, 2021, which claims priority under 35 U.S.C. § 119 to Japanese Patent Application No. 2020-200124 filed on Dec. 2, 2020, the disclosures of which are hereby incorporated by reference in their entireties.

TECHNICAL FIELD

This invention relates to a combine harvester, which determines an interruption position as appropriate in order to interrupt an automatic reaping operation and perform a mid-course work, and a method of self-driving of the combine harvester.

BACKGROUND ART

Conventionally, a combine harvester that reaps grain culms while traveling in a field can perform an automatic reaping travel through a preset travel route based on its own location information by using a satellite positioning system such as a GPS or the like. The combine harvester may also perform other mid-course works during the automatic reaping travel, such as discharging the grain stored after reaping or refueling. Such the mid-course work is performed off a travel route of the automatic reaping travel at the mid-course work position on a headland or the like.

For example, an autonomous travel system disclosed in Patent Literature 1 has a route setting unit that sets a travel route for performing an autonomous travel, an autonomous travel control unit that performs an autonomous travel control of a machine body based on the machine body's position and the travel route, a state detection unit that detects a state of a harvester, and an interruption determination unit that can determine interruption of the autonomous travel based on a detection result of the state detection unit. When the interruption of the autonomous travel is determined by the interruption determination unit, the route setting unit generates a mid-course work route for moving the combine harvester to a mid-course work position, based on a mid-course work position in the field for working after the interruption of the autonomous travel, a position of the machine body when the interruption of the autonomous travel is determined, and a harvest state of the field.

CITATION LIST

Patent Literature

Patent Literature 1: Japanese Patent Laid-open Publication No. 2020-22429

DISCLOSURE OF INVENTION

Problems to be Solved by the Invention

When shifting to the mid-course work in the middle of the automatic reaping travel, there may be non-reaped region on the travel route from an interruption position of the automatic reaping travel to the mid-course work position. So it is necessary to generate a travel route to reach the mid-course work position while avoiding non-reaped region. In the conventional art as disclosed in Patent Literature 1, the mid-course work position is generated based on the mid-course work position and the position of the machine body, and the position of the machine body is determined without considering a positional relationship between the mid-course work position and the non-worked region (non-reaped region). The non-reaped region exists between the mid-course work position and the machine position, this makes it difficult to generate a travel route up to the mid-course work position, and thus the travel route to avoid the non-reaped region becomes more complicated. Furthermore, when the interruption position is far away from the mid-course work position, the travel route becomes longer. As a result, it is impossible to move to the mid-course work position and perform the mid-course work smoothly, and thus it takes time to complete the mid-course work. This causes a problem that it takes time until the automatic reaping travel is finished.

It is an object of the present invention to provide a combine harvester and an automatic driving method capable of interrupting an automatic reaping travel at an appropriate position with respect to a mid-course work position and performing an automatic reaping travel and a mid-course work smoothly.

Means for Solving the Problems

To solve the above problem, the combine harvester of the present invention is a combine harvester performing an automatic reaping travel along a travel route, including: a travel route generation unit to generate the travel route by combining a plurality of routes for a non-reaped region of a field; a position setting unit to set an interruption position where the automatic reaping is interrupted based on a workload at the end of a predetermined interruption route in order to perform a mid-course work according to the workload of a reaping travel at a predetermined mid-course work position; a mid-course work route generation unit to generate a mid-course work route from the interruption position toward the mid-course work position in order to perform the mid-course work; and an automatic drive control unit to control an autonomous travel or an automatic reaping according to the travel route or the mid-course work route.

In the combine harvester of the present invention, the position setting unit may set as the interruption route a route in which a travel direction is on the side of a headland where the mid-course work position is provided.

In the combine harvester of the present invention, the position setting unit may set in advance as the mid-course work position to perform the mid-course work a discharge position where stored grains are discharged, and predict as the interruption route a route before the limit position where an accumulated harvest amount of grain is full.

In the combine harvester of the present invention, the mid-course work route generation unit may set an interruption turning circle whose tangent is a linear route entering the interruption position and an entry turning circle whose tangent is a linear route entering the mid-course work position, and generate the mid-course work route based on the interruption turning circle, the entry turning circle, and a common tangent between the interruption turning circle and the entry turning circle when the interruption turning circle does not contact the entry turning circle, and the automatic drive control unit may switch the automatic reaping travel of the travel route to a mid-course work travel of the mid-course work route when the combine harvester reaches the interruption position by the automatic reaping travel.

The combine harvester of the present invention may further include a selection unit to select, as an entry pattern into the mid-course work position that is applied to the mid-course work route when the interruption turning circle contacts the entry turning circle, any one of the following patterns: a first entry pattern in which the combine harvester goes around a reaped region and then advances to the mid-course work position to enter; a second entry pattern in which the combine harvester automatically retreats and enters from the side of an exit direction of the mid-course work position; and a third entry pattern in which the combine harvester manually retreats and enters from the side of the exit direction of the mid-course work position.

In the combine harvester of the present invention, the position setting unit may set as a resumption route a route subsequent to the interruption route or a route closest to the mid-course work position, and set a resuming position to resume the automatic reaping travel at the beginning of the resumption route in order to resume the automatic reaping travel after completion of the mid-course work, the mid-course work route generation unit may set an exit turning circle whose tangent is a linear route exiting from the mid-course work position and a resumption turning circle whose tangent is a liner route entering the resumption position, and generate a resumption route based on the exit turning circle, the resumption turning circle, and a common tangent between the exit turning circle and the resumption turning circle, and the automatic drive control unit may control an autonomous travel so as to perform a resumption travel of the resumption route after the completion of the mid-course work, and switch the resumption travel of the resumption route to the automatic reaping travel of the travel route when the combine harvester reaches the resumption position by the resumption travel.

In the combine harvester of the above invention, if there is an obstacle on the created mid-course work route, said mid-course work route generation unit may set an avoidance turning circle to avoid the obstacle, connect the interruption turning circle and the avoidance turning circle by the common tangent line of the interruption turning circle and the avoidance turning circle, and also connect the avoidance turning circle and the entry turning circle by the common tangent line of the interruption turning circle and the avoidance turning circle. It is recommended to recreate the mid-course work path by connecting the avoiding turning circle and the entry turning circle by the common tangent of the avoiding turning circle and the entry turning circle.

In the combine harvester of the present invention, when there is an obstacle on the resumption route, the mid-course work route generation unit may set an avoidance turning circle to avoid the obstacle and regenerate the resumption route by connecting the exit turning circle and the avoidance turning circle by a common tangent of the exit turning circle and the avoidance turning circle as well as connecting the avoidance turning circle and the resumption turning circle by a common tangent of the avoidance turning circle and the resumption turning circle.

To solve the above problem, the automatic drive method of the present invention is an automatic drive method of a combine harvester performing an automatic reaping travel along a travel route, including: a travel route generation step to generate the travel route by combining a plurality of routes for a non-reaped region of a field; a position setting step to set an interruption position where the automatic reaping is interrupted based on a workload at the end of a predetermined interruption route in order to perform a mid-course work according to the workload of a reaping travel at a predetermined mid-course work position; a mid-course work route generation step to generate a mid-course work route from the interruption position toward the mid-course work position in order to perform the mid-course work; and an automatic drive control step to control an autonomous travel or an automatic reaping according to the travel route or the mid-course work route.

In the automatic drive method of the present invention, the position setting step may set as the interruption route a route in which a travel direction is on the side of a headland where the mid-course work position is provided.

In the automatic drive method of the present invention, the position setting step may set in advance as the mid-course work position to perform the mid-course work a discharge position where stored grains are discharged, and predict as the interruption route a route before the limit position where an accumulated harvest amount of grain is full.

In the automatic drive method of the present invention, the mid-course work route generation step may set an interruption turning circle whose tangent is a linear route entering the interruption position and an entry turning circle whose tangent is a linear route entering the mid-course work position, and generate the mid-course work route based on the interruption turning circle, the entry turning circle, and a common tangent between the interruption turning circle and the entry turning circle when the interruption turning circle does not contact the entry turning circle, and the automatic drive control step may switch the automatic reaping travel of the travel route to a mid-course work travel of the mid-course work route when the combine harvester reaches the interruption position by the automatic reaping travel.

In the above automatic operation method, when the interruption turning circle and the entry turning circle are in contact with each other, the method is further provided with a process for selecting, as an entry pattern to the mid-course work position to be applied to the mid-course work route, either a first entry pattern in which the mowing area is circled before advancing to the mid-course work position, a second entry pattern in which the mowing area is circled before advancing to the mid-course work position, or a third entry pattern in which the mowing area is circled after advancing to the mid-course work position. The second pattern is to automatically retreat from the exit direction of the mid-course working position, and the third pattern is to manually retreat from the exit direction of the mid-course working position.

In the automatic drive method of the present invention, the position setting step may set as a resumption route a route subsequent to the interruption route or a route closest to the mid-course work position, and set a resuming position to resume the automatic reaping travel at the beginning of the resumption route in order to resume the automatic reaping travel after completion of the mid-course work, the mid-course work route generation step may set an exit turning circle whose tangent is a linear route exiting from the mid-course work position and a resumption turning circle whose tangent is a liner route entering the resumption position, and generate a resumption route based on the exit turning circle, the resumption turning circle, and a common tangent between the exit turning circle and the resumption turning circle, and the automatic drive control step may control an autonomous travel so as to perform a resumption travel of the resumption route after the completion of the mid-course work, and switch the resumption travel of the resumption route to the automatic reaping travel of the travel route when the combine harvester reaches the resumption position by the resumption travel.

In the automatic drive method of the present invention, when there is an obstacle on the generated mid-course work route, the mid-course work route generation step may set an avoidance turning circle to avoid the obstacle and regenerate the mid-course work route by connecting the interruption turning circle and the avoidance turning circle by a common tangent of the interruption turning circle and the avoidance turning circle as well as connecting the avoidance turning circle and the entry turning circle by a common tangent of the avoidance turning circle and the entry turning circle.

In the automatic drive method of the present invention, when there is an obstacle on the resumption route, the mid-course work route generation step may set an avoidance turning circle to avoid the obstacle and regenerate the resumption route by connecting the exit turning circle and the avoidance turning circle by a common tangent of the exit turning circle and the avoidance turning circle as well as connecting the avoidance turning circle and the resumption turning circle by a common tangent of the avoidance turning circle and the resumption turning circle.

Effect of the Invention

According to the present invention, a combine harvester and an automatic driving method capable of interrupting an automatic reaping travel at an appropriate position with respect to a mid-course work position and performing an automatic reaping travel and a mid-course work smoothly are provided.

DESCRIPTION OF EMBODIMENTS

A combine harvester 1 according to an embodiment of the present invention will be described. The combine harvester 1 travels in a field as a target to be worked by automatic driving or manual operation, and performs work such as reaping in order to perform a harvest work of crops from grain culms planted in the field. The combine harvester 1 is configured to perform, for example, an automatic work in which steering is controlled by automatic driving while the traveling speed is controlled in response to a manual operation, or an unmanned operation in which the steering and the traveling speed are controlled by the automatic driving, this makes it possible to autonomously travel, turn, and work in the field.

The combine harvester 1 is configured to perform an automatic reaping travel according to a travel route with a predetermined travel pattern. For example, the combine harvester 1 performs the automatic reaping travel with a travel pattern such as reciprocating reaping in which the combine harvester 1 reciprocates between plural routes in a region having non-reaped grain culm (hereinafter, referred to as a "non-reaped region") in the field, or whirl reaping in which reaping is repeated by shifting the circumferential trip of the route along an inner periphery of the non-reaped region toward the center side thereof. The combine harvester 1 is also configured to automatically perform a mid-course work travel along the mid-course work route to the mid-course work position in order to interrupt the automatic reaping travel in the middle and perform other mid-course works such as grain discharge and refueling. An external device for performing the mid-course work is provided in the vicinity of the mid-course work position.

Figure 1:
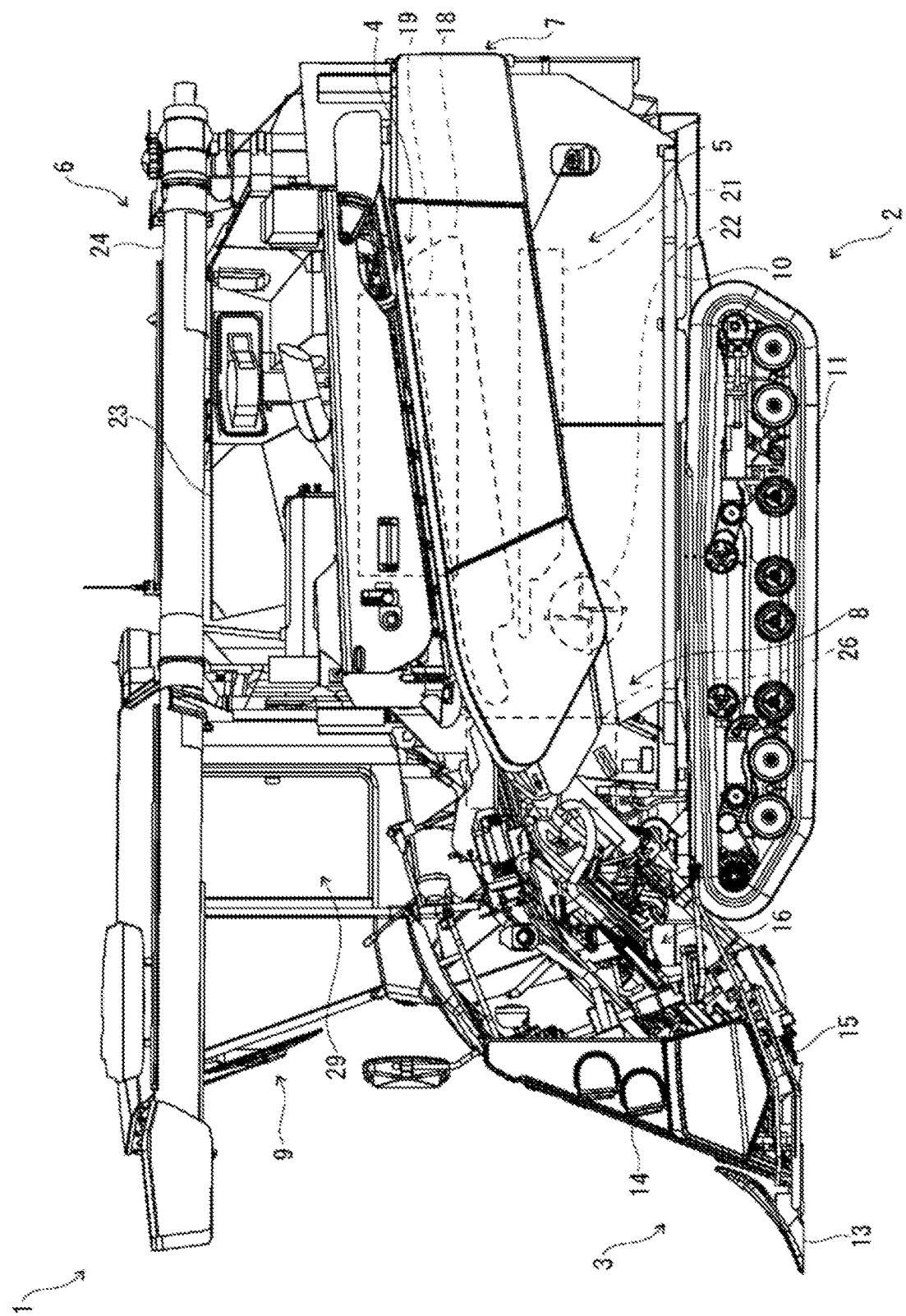
FIG. 1 is a side view of a combine harvester according to an embodiment of the present invention.

As shown in FIG. 1, the combine harvester 1 includes a traveling part 2, a reaping part 3, a threshing part 4, a sorting part 5, an accumulation part 6, a discharged straw processing part 7, a power unit 8, and a steering part 9, and is configured as a so-called head-feeding combine harvester. While travelling by the traveling part 2, the combine harvester 1 threshes, by the threshing part 4, grain culms reaped by the reaping part 3, sorts the grains by the sorting part 5, and stores the grains in the accumulation part 6. With the discharged straw processing part 7, the combine harvester 1 processes waste straw after the threshing. By the power supplied by the power unit 8, the combine harvester 1 drives the traveling part 2, the reaping part 3, the threshing part 4, the sorting part 5, the accumulation part 6, and the discharged straw processing part 7.

The traveling part 2 is provided below a machine body frame 10, and includes a pair of crawler type traveling devices 11 on each side and a transmission (not shown). The traveling part 2 causes the combine harvester 1 to travel in a forward-and-backward direction or to turn to a left-and-right direction by rotating the crawler of the crawler type traveling device 11 using power (e.g., rotation power) transmitted from an engine 26 of the power unit 8. The transmission transmits power (rotational power) of the power unit 8 to the crawler type traveling device 11 and is capable of shifting the rotational power.

The reaping part 3 is provided in front of the traveling part 2, and performs reaping work on the rows within the maximum number of reaping rows included in a predetermined reaping width. The reaping part 3 includes a divider 13, a raising device 14, a cutting device 15, and a conveying device 16. The divider 13 divides grain culms in the field for every row and guides a predetermined number of grain culms for rows within the maximum number of reaping rows to the raising device 14. The raising device 14 raises the grain culms guided by the divider 13. The cutting device 15 cuts the grain culms raised by the raising device 14. The conveying device 16 conveys the grain culms cut by the cutting device 15 to the threshing part 4.

The threshing part 4 is provided in the rear of the reaping part 3. The threshing part 4 includes a feed chain 18 and a threshing cylinder 19. The feed chain 18 conveys, for threshing, the grain culms conveyed from the conveying device 16 of the reaping part 3, and further conveys the grain culms after threshing, that is, discharged straws to the discharged straw processing part 7. The threshing cylinder 19 threshes the grain culms being conveyed by the feed chain 18.

The sorting part 5 is provided below the threshing part 4. The sorting part 5 includes a swing sorting device 21, a wind sorting device 22, a grain conveying device (not shown), and a waste straw discharging device (not shown). The swing sorting device 21 sifts the threshed grains that falls from the threshing part 4 and sorts the threshed grains into grain, waste straw, etc. The wind sorting device 22 further sorts the threshed grains sorted by the swing sorting device 21 into grain, waste straw, etc., by air blow. The grain conveying device conveys the grains sorted by the swing sorting device 21 and the wind sorting device 22 to the accumulation part 6. The waste straw discharging device discharges the waste straw and the like sorted by the swing sorting device 21 and the wind sorting device 22 to the outside of the combine harvester.

The accumulation part 6 is installed on the right side of the threshing part 4. The accumulation part 6 includes a grain tank 23 and a discharge device 24. The grain tank 23 stores the grains conveyed from the sorting part 5. The discharge device 24 is composed of an auger or the like and performs a discharging work of the grains, which is to discharge the grains stored in the grain tank 23 to any place. When the combine harvester 1 reaches a discharge position of the mid-course work position and is ready for the discharge operation, the discharge device 24 performs the discharge operation automatically controlled by the control device 50 (see FIG. 3) or manually in response to operation of the steering part 9.

Figure 3:
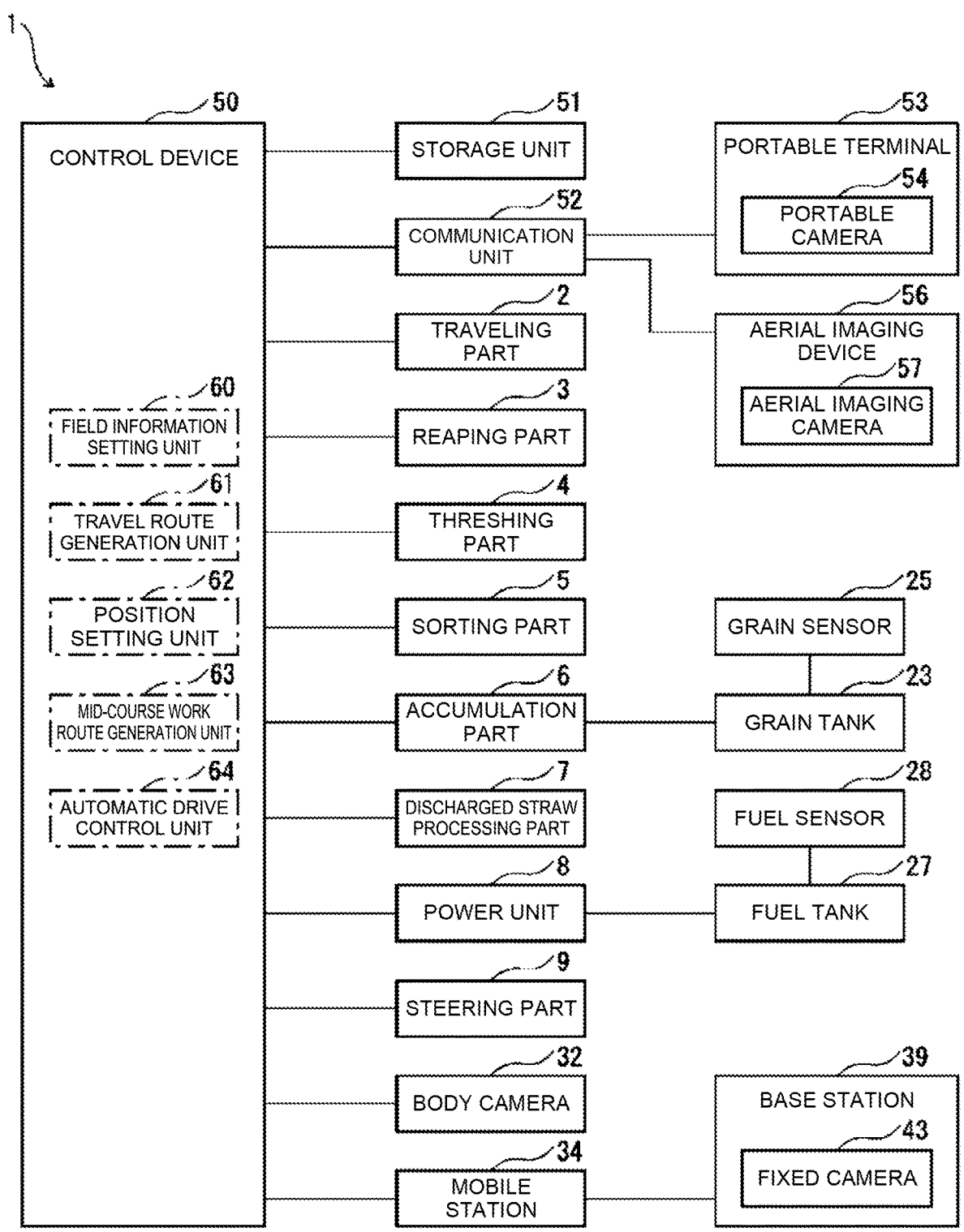
FIG. 3 is a block diagram of the combine harvester according to the embodiment of the present invention.

The combine harvester 1 is also equipped with a grain sensor 25 that detects the amount of grain stored in the grain tank 23 of the accumulation part 6 (hereinafter, referred to as the accumulated harvest amount [kg]) (see FIG. 3). The grain sensor 25 may, for example, is composed of a plurality of chaff sensors located at predetermined intervals at a plurality of positions in the height direction of the grain tank 23. Each chaff sensor turns on when there is grain at the located height and turns off when there is no grain. The grain sensor 25 detects the accumulated harvest amount of grain based on the height of the chaff sensor when turning on or the height of the chaff sensor when turning off. Alternatively, the grain sensor 25 may be composed of a weight sensor or other sensor to detect the accumulated harvest amount of grain.

The discharged straw processing part 7 is provided behind the threshing part 4. The discharged straw processing part 7 includes a discharged straw conveying device (not shown) and a discharged straw cutting device (not shown). The discharged straw conveying device conveys the discharged straw conveyed from the feed chain 18 of the threshing part 4 to the discharged straw cutting device. The discharged straw cutting device cuts the discharged straw conveyed by the discharged straw conveying device, and discharges the cut discharged straw to the outside of the combine harvester, for example, discharged right rearward of the combine harvester 1.

The power unit 8 is provided above the traveling part 2 and in front of the accumulation part 6. The power unit 8 includes an engine 26 that generates rotational power. The power unit 8 transmits the rotational power generated by the engine 26 to the traveling part 2, the reaping part 3, the threshing part 4, the sorting part 5, the accumulation part 6, and the discharged straw processing part 7. The combine harvester 1 is also equipped with a fuel tank 27 that contains fuel to be supplied to the engine 26 of the power unit 8, and furthermore, a fuel sensor 28 that detects the remaining amount of fuel in the fuel tank 27 (see FIG. 3). The fuel tank 27 is located on the right side of the combine harvester 1.

The steering part 9 is provided above the power unit 8. The steering part 9 includes a driver's seat 29 and a plurality of operation tools (not shown). The driver's seat 29 is a seat on which an operator sits, and is provided on the right side, for example. The operation tool includes a steering wheel for changing the travel direction of the combine harvester 1, that is, steering the combine harvester 1, and the operator is able to control the travel and work of the combine harvester 1 by operating the operation tool such as a steering wheel. The operation tools also include an accelerator to adjust the speed of the engine 26, that is, the traveling speed of the traveling part 2 of the combine harvester 1, and an up-and-down switch for lifting and lowering the reaping part 3.

The combine harvester 1 includes an onboard camera 32 (see FIG. 3) that captures images around the combine harvester 1. The onboard camera 32 photographs a target work field and obtains field images.

Figure 2:
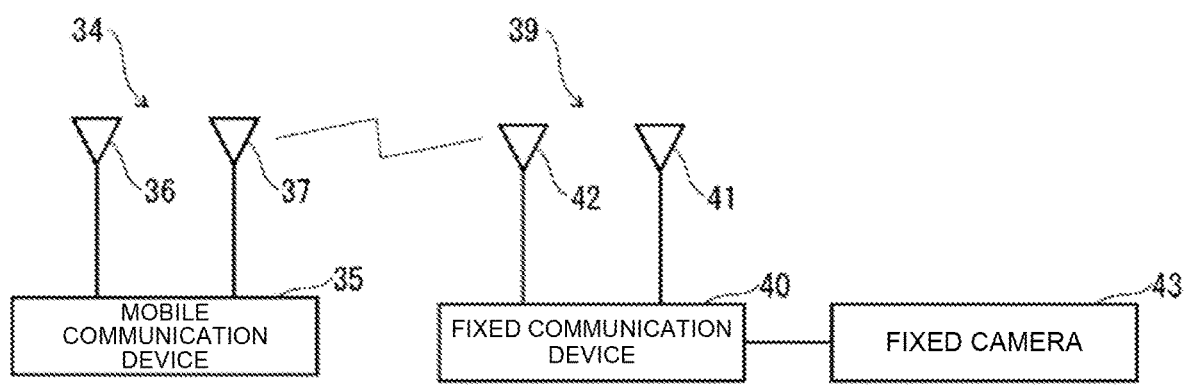
FIG. 2 is a block diagram of a mobile station and a base station for the combine harvester according to the embodiment of the present invention.

As shown in FIG. 2, the combine harvester 1 includes a mobile station 34 which uses a satellite positioning system such as GPS or the like to obtain position information on the combine harvester 1. The mobile station 34 is equipped with, for example, a mobile communication device 35, a mobile GPS antenna 36, and a data receiving antenna 37. The mobile communication device 35 communicates with GPS satellites via the mobile GPS antenna 36 to obtain the position information on the mobile station 34, that is, the position information on the combine harvester 1.

The base station 39 may be built at a levee around a target work field for the combine harvester 1 as illustrated in FIG. 2. For the present embodiment, an example is given in which the base station 39 is used for correcting the position information of the combine harvester 1, the base station 39 may not be provided, and correction of the position information using the base station 39 may not be performed. The base station 39 includes a fixed communication device 40, a fixed GPS antenna 41, and a data transmitting antenna 42. The fixed communication device 40 communicates with GPS satellites via the fixed GPS antenna 41 to obtain the position information on the base station 39. The fixed communication device 40 transmits correction information based on the position information of the base station 39 to the mobile communication device 35 via the data transmitting antenna 42.

The base station 39 also includes a fixed camera 43 for photographing a field. The fixed camera 43 photographs the target work field and obtains field images. The fixed communication device 40 obtains the images captured by the fixed camera 43, and transmits it to the mobile communication device 35 via the data transmitting antenna 42.

The mobile communication device 35 of the mobile station 34 communicates wirelessly with the fixed communication device 40 of the base station 39 via the data receiving antenna 37. The mobile communication device 35 receives the correction information from the fixed communication device 40, and corrects the position information of the mobile station 34, that is, the position information of the combine harvester 1 based on the correction information. From the fixed communication device 40, the mobile communication device 35 receives the field images captured by the fixed camera 43.

Next, a control device 50 of the combine harvester 1 will be described with reference to FIG. 3.

The control device 50 is composed of a computer such as a CPU, and is connected to a storage unit 51 such as a ROM, a RAM, a hard disk drive, and a flash memory. The storage unit 51 stores programs and data for controlling various components and various functions of the combine harvester 1, and the control device 50 performs arithmetic operations based on the programs and data stored in the storage unit 51, thereby controlling the various components and functions of the combine harvester 1.

For example, the control device 50 controls the mobile station 34 to obtain the position information on the combine harvester 1 from the mobile communication device 35. The control device 50 controls the grain sensor 25 to detect the accumulated harvest amount of grain in the grain tank 23 and obtains the accumulated harvested amount from the grain sensor 25. The control device 50 controls the fuel sensor 28 to detect the remaining amount of fuel in the fuel tank 27 and obtains the remaining fuel amount from the fuel sensor 28.

The combine harvester 1 includes a communication unit 52, and the control device 50 communicates wirelessly with an external device such as a portable terminal 53 owned by the operator via the communication unit 52 to transmit and receive various information to and from the portable terminal 53. The portable terminal 53, which is one of the constituent components of the combine harvester 1 and is a terminal that can remotely operate the combine harvester 1, is composed of, for example, a tablet terminal equipped with a touch panel, a laptop personal computer, or the like. An operation tool similar to that of the portable terminal 53 may be provided in the steering part 9. The portable terminal 53 may include a portable camera 54 for capturing images. The portable camera 54, for example, photographs the target work field and obtains field images. For the present embodiment, an example is given in which the portable camera 54 is used for obtaining field information, the portable camera 54 may not be provided, and obtaining the field information using the portable camera 54 may not be performed.

The portable terminal 53 is configured to accept an input operation for the field information about the target work field through a touch operation on the touch panel or the like. The portable terminal 53 displays a field information setting screen so that a shape, a size, and position information (coordinates and the like) of a field edge constituting an outer circumference of the field, and a shape, a size, and position information (coordinates and the like) of a non-reaped region of the field can be set as field information. Furthermore, a mid-course work position, where other mid-course works such as discharge of grain and refill of fuel are performed, can be set as field information by the portable terminal 53. While displaying a field map based on the field information, the portable terminal 53 can also display a travel route of the combine harvester 1 on the field map so that its traveling direction can be seen.

The mid-course work position is set, for example, in the outside of the headland of the field. When performing the mid-course work, the combine harvester 1 stops at the mid-course work position with the right side of its body facing the outside of the headland, for example. When discharge of grain is performed, the mid-course work position is a discharge position, and a grain transport truck or the like is provided on the levee outside the headland region as an external device for the discharge operation. When refill of fuel is performed, the mid-course work position is a refill position, and a fuel refilling equipment or the like is provided on the levee outside the headland region as an external device for the refill operation. The mid-course work position may be set at a predetermined distance in a front-back direction along the periphery of the headland so that the combine harvester 1 can smoothly enter and exit from the mid-course work position.

The portable terminal 53 has a function to accept a selection of a traveling pattern of the autonomous reaping travel of the combine harvester 1, and when generating a travel route of the autonomous reaping travel, it displays on the touch panel a traveling selection screen for selecting the traveling pattern of the reciprocating reaping or the whirl reaping. The portable terminal 53 transmits the traveling pattern (the reciprocating reaping or the whirl reaping) input according to the operation on the traveling selection screen to the combine harvester 1 to issue an instruction to generate the travel route.

If an entry pattern into the mid-course work position is selectable when generating the mid-course work route, the portable terminal 53 functions as a selection unit that accepts the selection of the entry pattern. When the portable terminal 53 as the selection unit receives from the combine harvester 1a request for selection of the entry pattern, it displays on the touch panel an entry pattern selection screen to select the entry pattern. The portable terminal 53 transmits to the combine harvester 1 entry pattern selection information entered according to operation of the entry pattern selection screen.

The control device 50 may communicate wirelessly with an aerial imaging device 56, such as a drone with an aerial imaging camera 57, via the communication unit 52, and the aerial imaging device 56 may communicate wirelessly with the portable terminal 53. For the present embodiment, an example is given in which the aerial imaging device 56 and the aerial imaging camera 57 are used for obtaining field information, the aerial imaging device 56 and the aerial imaging camera 57 may not be provided, and obtaining the field information using the aerial imaging camera 57 may not be performed. The control device or the portable terminal 53 accepts from the operator an instruction to operate the aerial imaging device 56 or an instruction to photograph the field and transmits the instructions to the aerial imaging device 56. The aerial imaging device 56 operates according to the instruction to operate and controls the aerial imaging camera 57 according to the instruction to photograph, thereby photographing the field to obtain field images. The aerial imaging device 56 transmits the field images captured by the aerial imaging camera 57 to the control device 50 or the portable terminal 53.

The control device 50 receives the field images captured by the onboard camera 32, the fixed camera 43, the portable camera 54 or the aerial imaging camera 57, and causes the monitor of the steering part 9 to display the field images. Alternatively, the control device 50 may transmit the captured field images to the portable terminal 53 and causes the monitor of the portable terminal 53 to display the captured field images.

The combine harvester 1 stores in the storage unit 51 the maximum capacity that the grain tank 23 can store grain (hereinafter, referred to as the set harvest amount[kg]). Furthermore, the combine harvester 1 stores in the storage unit 51 the amount of grain that can be harvested per unit distance (e.g., 0.1 m) (hereinafter, referred to as unit harvest amount [kg/0.1 m]) in order to calculate a distance over which an automatic reaping travel can be performed (hereinafter, referred to as reapable distance) based on the accumulated harvest amount of grain in the grain tank 23 or an empty capacity to store grain (hereinafter, referred to as reapable harvest amount [kg]). Alternatively, the combine harvester 1 may store in the storage unit 51, for example, a bale/kg conversion coefficient [kg/bale] that converts the yield [kg] into the number of bale or a unit harvest coefficient [0.1 bale/1000 2] as a harvest coefficient in order to calculate the unit yield.

The combine harvester 1 stores in the storage unit 51 the maximum capacity that the fuel tank 27 can accommodate fuel (hereinafter, referred to as fuel capacity). Furthermore, the combine harvester 1 stores the amount of fuel consumed per the unit distance (hereinafter, referred to as unit consumption) in the storage unit 51 in order to calculate a reapable distance based on the remaining amount of fuel in the fuel tank 27. Alternatively, the combine harvester 1 may store fuel coefficient in the storage unit 51 in order to calculate the unit consumption.

The combine harvester 1 sets and stores in advance in the storage unit 51 a reaping width for each row or a reaping width per route (e.g., a reaping width of the rows of the maximum number of reaping rows) and the number of reaping rows per route (e.g., the maximum number of reaping rows) as the reaping capability value of the reaping part 3. The reaping width per route may be found based on the reaping width for each row.

In addition, by executing the program stored in the storage unit 51, the control device 50 operates as a field information setting unit 60, a travel route generation unit 61, a position setting unit 62, a mid-course work route generation unit 63, and an automatic drive control unit 64. The travel route generation unit 61, the position setting unit 62, the mid-course work route generation unit 63, and the automatic drive control unit 64 realize, in an automatic drive method of the present invention, a travel route generation step, a position setting step, a mid-course work route generation step, and an automatic drive control step, respectively. In the automatic drive method, the selection process is realized by the control device 50 based on the operation of the portable terminal 53 or the automatic drive operating unit 31, which functions as a selection unit described below.

The field information about the target work field is set in the field information setting unit 60 automatically or manually and stored in the storage unit 51. For example, the field information is set in the field information setting unit 60 manually according to an input operation of the field information to the field information setting screen of the portable terminal 53. Alternatively, the field information setting unit 60 acquires field images taken of the field by the onboard camera 32 of the combine harvester 1, the fixed camera 43 of the base station 39, the portable camera 54 of the portable terminal 53, or the aerial imaging camera 57 of the aerial imaging device 56, and automatically acquires field information by image analysis of the field images. The field information setting unit 60 may analyze the field information from the field images of one camera or two or more cameras among the onboard camera 32, the fixed camera 43, the portable camera 54, and the aerial imaging camera 57.

Furthermore, the field information setting unit 60 is able to obtain more accurate field information by matching the field information that is set manually through the portable terminal 53 with the field information that is set automatically based on the field images from the onboard camera 32, the fixed camera 43, the portable camera 54, or the aerial imaging camera 57.

The travel route generation unit 61 generates a travel route which is referenced by the combine harvester 1 for performing the autonomous travel and the autonomous reaping in the field by the automatic drive, and stores the generated travel route in the storage unit 51. The travel route includes not only a travel setting about traveling but also a work setting about a work such as reaping. The travel setting includes, in addition to a travel position in the field, a travel speed and a travel direction (steering direction and advancing or retreating) at each travel position. The work setting includes information about actuation or stop of reaping at each travel position, reaping speed and reaping height, the number of rows to be reaped, and other works.

The travel route generation unit 61 sets a work route for reaping while traveling in a linear manner to a non-reaped region in the field and sets a travel route by combining a plurality of linear routes. The travel route generation unit 61 generates a travel route according to the traveling pattern (reciprocating reaping or whirl reaping) selected in accordance with operation of the portable terminal 53 or the like. For example, the travel route generation unit 61 generates a travel route of a whirl reaping in which a circumferential operation of the work route along an inner periphery of the non-reaped region is repeated while a circumference of the circumferential operation is shifted toward a center, or a travel route of a reciprocating reaping in which a plurality of work routes are reciprocated in the non-reaped region.

The position setting unit 62 sets an interruption position where the automatic reaping travel is interrupted on the travel route based on a workload in order to perform the mid-course work at the mid-course work position according to the workload of the reaping travel. The position setting unit 62, for example, sets the interruption position based on the workload, such as the accumulated harvest amount of grain in the grain tank 23 or the reapable yield of grain, in order to discharge grain stored in the grain tank 23 as the mid-course work. The position setting unit 62, for example, also sets the interruption position based on the workload, such as the amount of fuel remaining in the fuel tank 27 in order to refill the fuel tank 27 as the mid-course work.

When setting the interruption position based on the accumulated harvest amount of grain in the grain tank 23 or the reapable yield of grain, the position setting unit 62 first acquires the accumulated harvest amount of grain in the grain tank 23 or the reapable yield of grain from the grain sensor 25. The reapable yield may be obtained by subtracting the accumulated harvest amount from the set yield. The position setting unit 62 obtains the unit yield from the storage unit 51 or calculates the unit yield based on the harvest coefficient, for example, by multiplying the unit yield coefficient with the bale/kg conversion coefficient and the reaping width. The position setting unit 62 then calculates the reapable distance by dividing the reapable yield by the unit yield.

In order to calculate the reapable distance according to the crop and field conditions, the unit yield to be stored in the storage unit 51 may be backward calculated from information when the grain tank 23 is actually full and then stored. For example, when the grain tank 23 is full, the accumulated harvest amount is divided by the travel distance or travel time from empty to full and stored as the unit yield for the field.

Alternatively, when setting the interruption position based on the amount of fuel remaining in the fuel tank 27, the position setting unit 62 first obtains the amount of fuel remaining in the fuel tank 27 from the fuel sensor 28. The position setting unit 62 obtains the unit consumption from the storage unit 51 or calculates the unit yield based on the fuel coefficient. The position setting unit 62 then calculates the reapable distance by dividing the remaining fuel by the unit yield.

The position setting unit 62 detects a position where the reapable distance terminates on the travel route (hereinafter, referred to as a limit position) based on the travel route generated by the travel route generation unit 61, the current position information of the combine harvester 1, and the calculated reapable distance, and a work route with the limit position (hereinafter, referred to as a limit route). For example, the limit position is a position where the accumulated harvest amount reaches the set yield and the grain tank 23 is full, or a position where the remaining fuel amount reaches zero or the lower limit value and the fuel tank 27 is empty.

The position setting unit 62 sets a predetermined route before the limit route in the travel route as an interruption route, and sets the interruption position at the end of the interruption route. It is preferred that the interruption route is close to the mid-course work position, and the end of the interruption route is a position where the mid-course work position can be seen. The position setting unit 62 sets the interruption route and the interruption position so that a turning angle from the interruption position to the mid-course work position is within a range of a predetermined angular threshold (e.g., 180 degrees).

Figure 4:
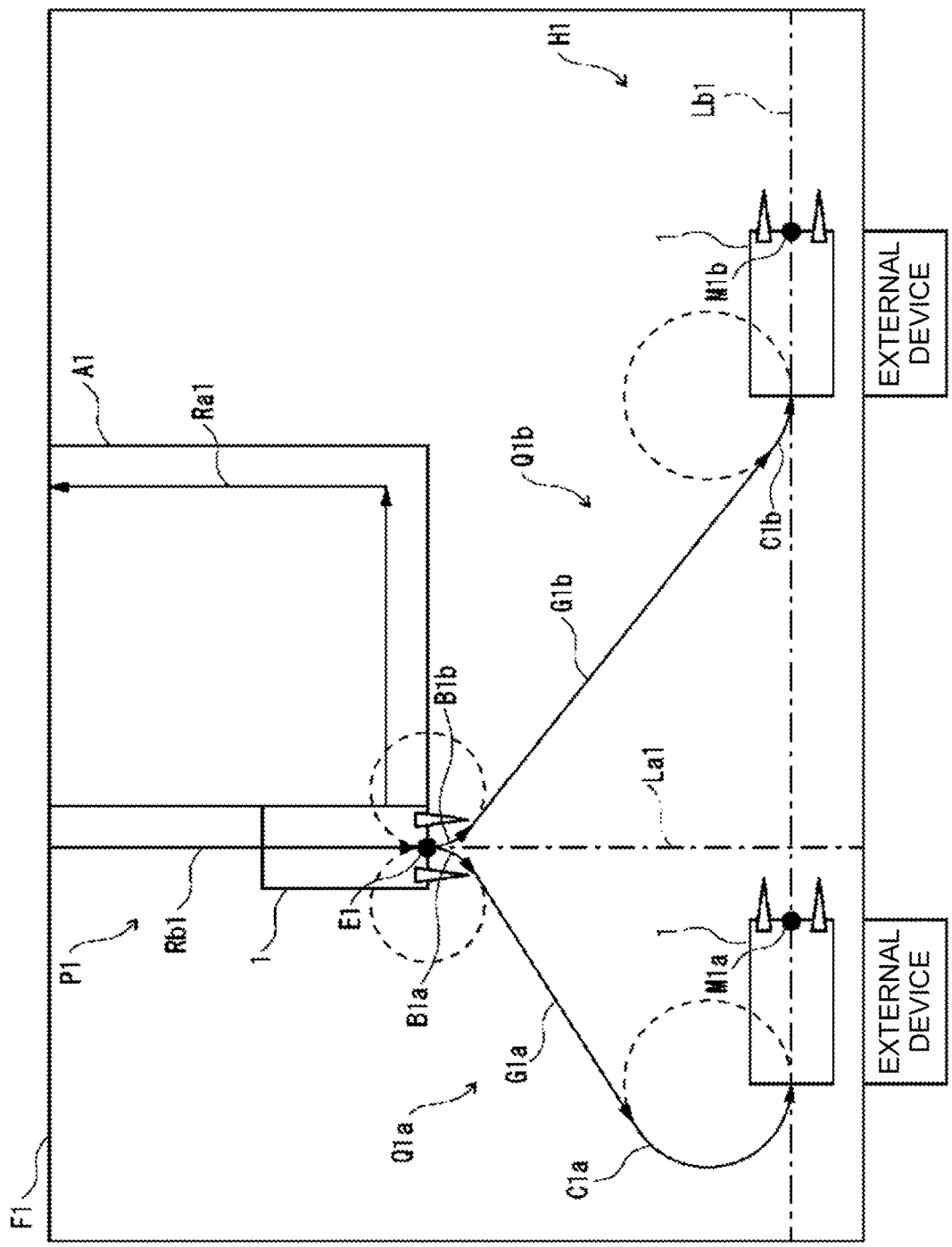
FIG. 4 is a plan view illustrating an example of a field in which an interruption position and a mid-course travel route are set in the combine harvester according to the embodiment of the present invention.

For example, as shown in FIG. 4, an example is given where the limit route Ra1 is detected from the travel route P1 of the whirl reaping set in the non-reaped region A1 of the field F1. In FIG. 4, two mid-course work positions M1a and M1b are illustrated, but any one of them may be only provided. In this example, when a virtual line La1 extending in a travel direction of the machine body of the combine harvester 1 positioned at a predetermined route before the limit route Ra1 intersects a virtual route Lb1 in the extending direction of the headland H1 where the mid-course work position M1a or M1b is provided, the position setting unit 62 sets the route as an interruption route Rb1, for example. In other words, the position setting unit 62 sets as the interruption route Ra1 a route in which the travel direction of the combine harvester 1 is toward the headland H1 where the mid-course work position M1a or M1b is provided, and which is the nearest to the limit route Ra1, among routes that are before the limit route Ra1. The position setting unit 62 sets an interruption position E1 at the end of the interruption route Rb1.

Figure 5:
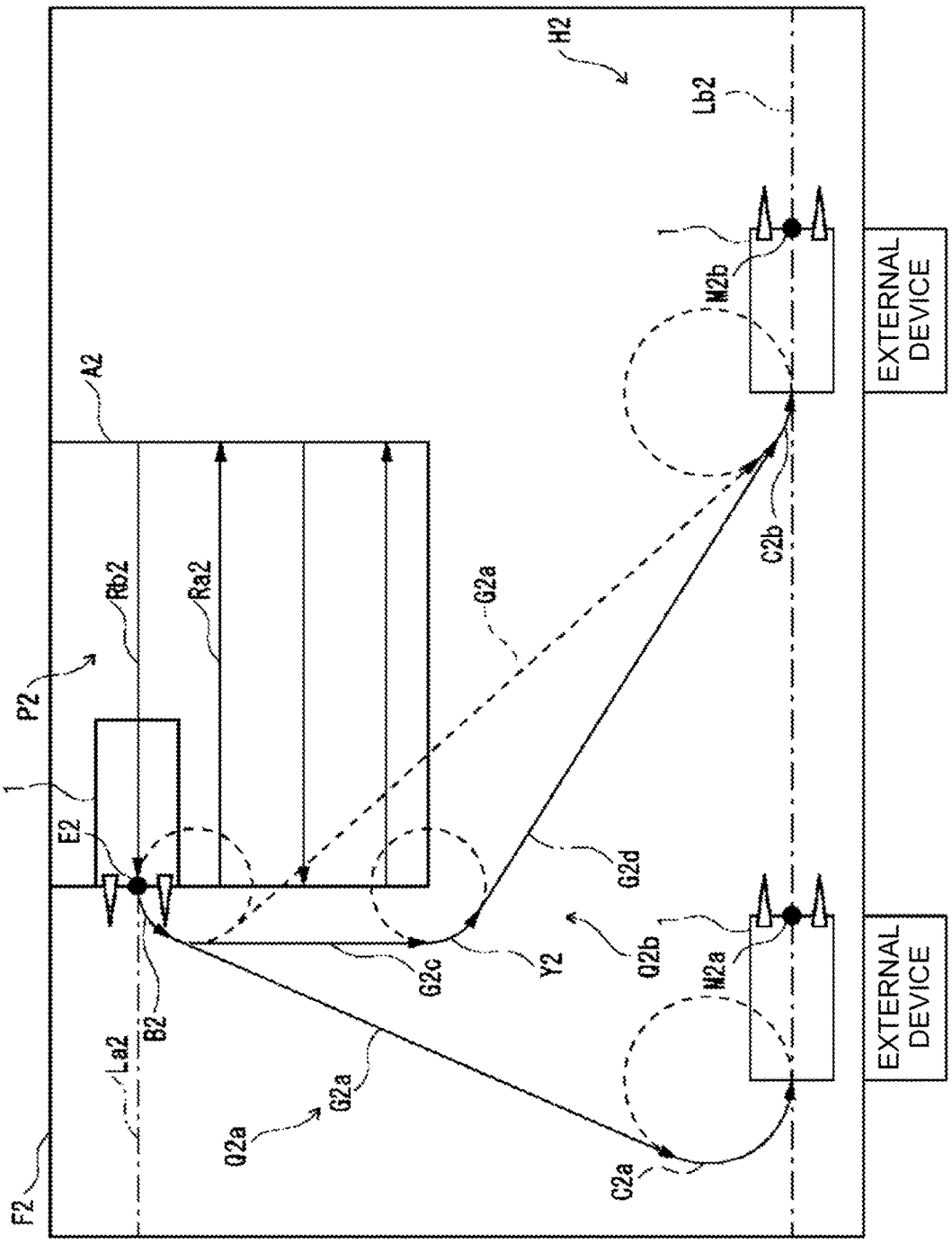
FIG. 5 is a plan view illustrating an example of a field in which an interruption position and a mid-course travel route are set in the combine harvester according to the embodiment of the present invention.

As shown in FIG. 5, an example is given where the limit route Ra2 is detected from the travel route P2 for the reciprocating reaping set in the non-reaped region A2 of the field F2. In FIG. 5, two mid-course work positions M2a and M2b are illustrated, but any one of them may be only provided. When a virtual line La2 extending in a travel direction of the machine body of the combine harvester 1 positioned at a predetermined route before the limit route Ra2 does not intersect a virtual route Lb2 in the extending direction of the headland H1 where the mid-course work position M2a or M2b is provided, the position setting unit 62 may set the route as an interruption route Rb2. In other words, the position setting unit 62 sets as the interruption route Rb2 a route in which the travel direction of the combine harvester 1 is not toward the headland H2 where the mid-course work position M2a or M2b is provided, and which is the nearest to the limit route Ra2, among routes that are before the limit route Ra2. In this case, the interruption route Rb2 is preferably a route where the side of the combine harvester 1 is on the side of the headland H2 where the mid-course work position M2a or M2b is provided, and preferably closer to the mid-course work position M2a or M2b. The position setting unit 62 sets an interruption position E2 at the end of the interruption route Rb2.

The position setting unit 62 determines the interruption position at predetermined timing in the automatic reaping travel and sets it. For example, the position setting unit 62 may set the interruption position at a predetermined cycle of the automatic reaping travel. For example, the position setting unit 62 may determine the interruption position for each lapse of a predetermined time or for each termination of a predetermined distance, or for each lap of the whirl reaping or for each round trip of the reciprocating reaping. Alternatively, the position setting unit 62 may determine the interruption position at the timing when the travel route is generated by the travel route generation unit 61. Alternatively, when the automatic reaping travel of the whirl reaping is performed around the non-reaped region, the position setting unit 62 may determine whether there is a limit position on the next lap in the route approaching the mid-course work position. If there is the limit position, the position setting unit 62 may determine the interruption position. Alternatively, when the automatic reaping travel of the reciprocating reaping is performed in a round trip manner in the non-reaped region, the position setting unit 62 may determine whether there is a limit position on the next round trip in the route approaching the mid-course work position. If there is the limit position, the position setting unit 62 may determine the interruption position.

Furthermore, the position setting unit 62 sets on the travel route a resumption position to resume the automatic reaping travel after the mid-course work is finished. The position setting unit 62, for example, sets as a resumption route a route subsequent to the interruption route or a route closest to the mid-course work position among the remaining routes of the travel route in the non-reaped region, and sets a resuming position at the beginning of the resumption route. The position setting unit 62 also sets the resumption route and the resumption position so that a turning angle from the mid-course work position to the resumption position is within a range of a predetermined angular threshold (e.g., 180 degrees).

Figure 6:
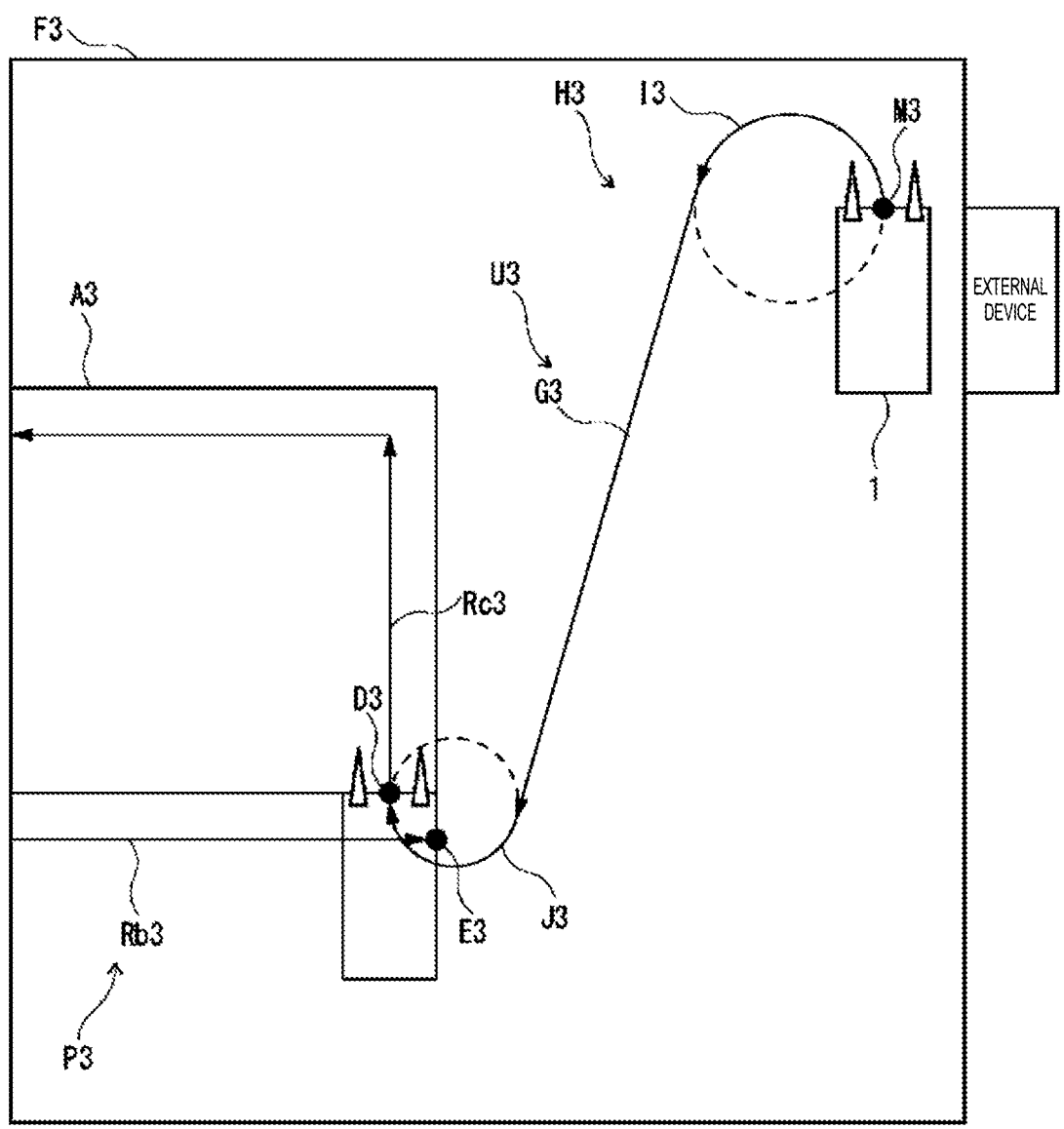
FIG. 6 is a plan view illustrating an example of a field in which a resumption position and a resumption route are set in the combine harvester according to the embodiment of the present invention.

For example, as shown in FIG. 6, an example is given where an interruption route Rb2 and the interruption position E3 are detected from the travel route P3 of the whirl reaping set in the non-reaped region A3 of the field F3. In this example, the position setting unit 62 sets as a resumption route Rc3 a route subsequent to the interruption route Rb3 on the travel route P3 for the combine harvester 1 at the mid-course work position M3 on the headland H3, and sets a resumption position D3 at the beginning of the resumption route Rc3, for example. In this case, the resumption position D3 may be identical to the interruption position E3.

Figure 7:
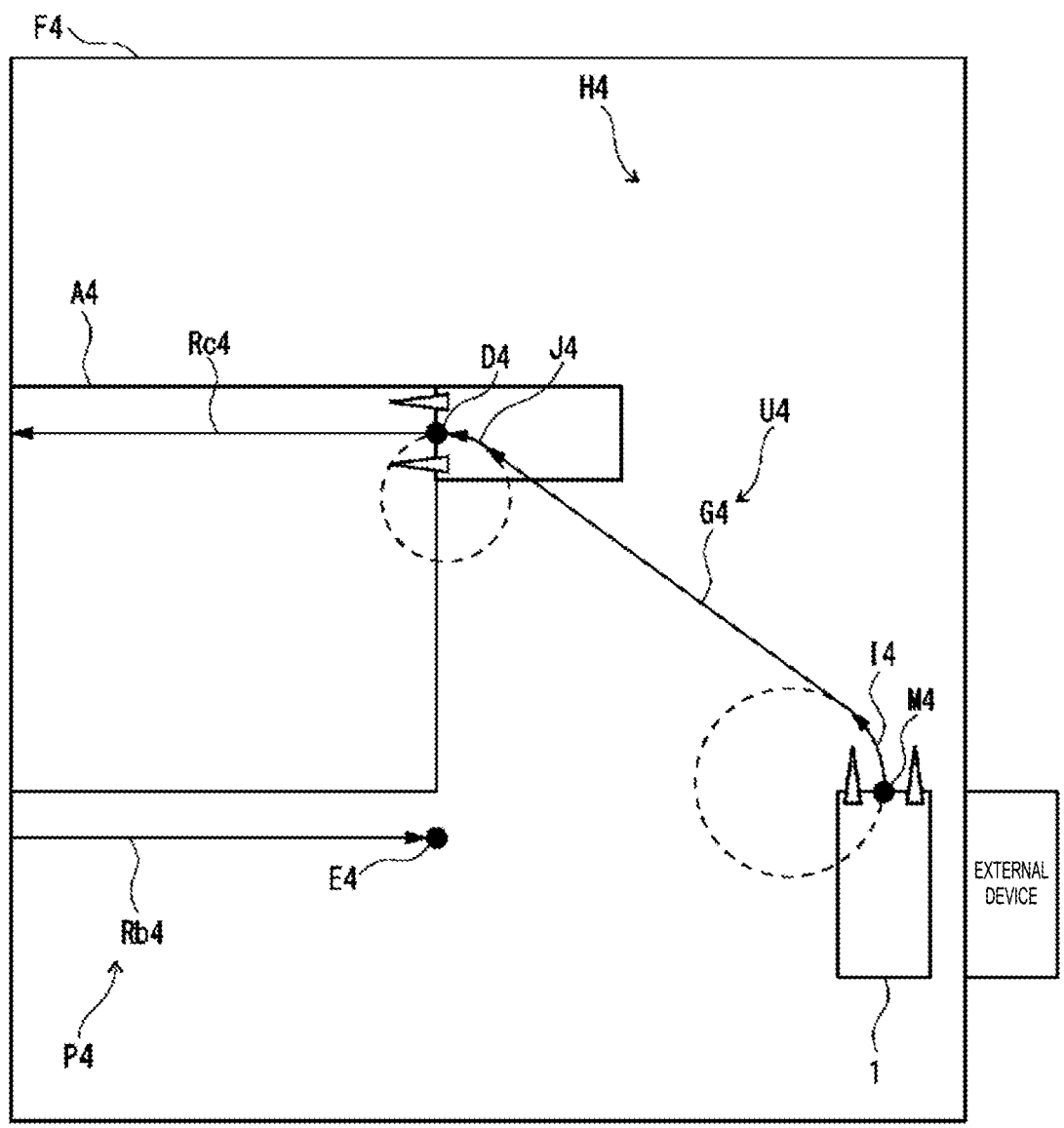
FIG. 7 is a plan view illustrating an example of a field in which a resumption position and a resumption route are set in the combine harvester according to the embodiment of the present invention.

As shown in FIG. 7, an example is given where an interruption route Rb4 and the interruption position E4 are detected from a travel route P4 of the whirl reaping set in the non-reaped region A4 of the field F4. In this example, the position setting unit 62 sets as a resumption route Rc4 a route closest to the mid-course work position M4 on the travel route P4 for the combine harvester 1 at the mid-course work position M4 on the headland H4, and sets a resumption position D4 at the beginning of the resumption route Rc4, for example.

The position setting unit 62 determines the resumption position at predetermined timing and sets it. For example, the position setting unit 62 may determine the resumption position at the same timing as the determination of the interruption position. Alternatively, the position setting unit 62 may determine the resumption position during the mid-course work or after the mid-course work is finished.

The mid-course work route generation unit 63 generates a mid-course work route from the interruption position set by the position setting unit 62 toward the preset mid-course work position in order to perform a mid-course work. The mid-course work route includes a travel setting related to traveling. The mid-course work travel, in which the combine harvester autonomously travels to the mid-course work position, is limited to the case where a width of the headland where the mid-course work position is provided is not less than a predetermined width threshold (e.g., 5.5 m) and a turning radius at the mid-course work position is not more than a predetermined turning radius threshold (e.g., 4.5 m).

The mid-course work route generation unit 63 transmits data on the generated mid-course work route to the portable terminal 53 and causes the touch panel to display it as well as notifies the operator that the mid-course work is required. For example, when a lap of the whirl reaping or a round trip of the reciprocating reaping, which includes the interruption route, is initiated, the mid-course work route generation unit 63 may transmit data on the mid-course work route. The display of the mid-course work route by the portable terminal 53 may end when the movement to the mid-course work position is completed.

For example, the mid-course work route generation unit 63 sets an interruption turning circle with a predetermined turning radius along which the combine harvester travels while turning from the interruption position and an entry turning circle with a predetermined turning radius along which the combine harvester travels while turning toward the mid-course work position, and generates a mid-course work route by connecting the interruption turning circle and the entry turning circle by a straight line. The turning radius of the interruption turning circle and the turning radius of the entry turning circle may be initially set to a predetermined minimum turning radius value (i.e., turning radius threshold) as an initial value and then vary depending on the width of the headland between the interruption turning circle and the entry turning circle. For example, the wider the width of the headland is, the larger the turning radius may be. The interruption turning circle is set as a circle whose tangent is a virtual line extending in the travel direction of the combine harvester 1 when the combine harvester reaches the interruption position (i.e., a virtual line aligned with a linear route entering the interruption position). The entry turning circle is set as a circle whose tangent is a virtual line extending in the travel direction of the combine harvester 1 when the combine harvester performs the mid-course work at the mid-course work position (i.e., a virtual line aligned with a linear route entering the mid-course work position).

If the mid-course work position is on the right side with respect to the virtual line in the travel direction of the combine harvester 1 at the interruption position, a clockwise interruption turning circle is set. If the mid-course work position is on the left side with respect to the virtual line in the travel direction of the combine harvester 1 at the interruption position, a counterclockwise interruption turning circle is set. If there is the headland on the right side of the travel direction of the combine harvester 1 at the mid-course work position, a counterclockwise entry turning circle is set. The entry turning circle is set with a relatively large turning radius so that contact between the combine harvester and the outside of the headland is avoided when the combine harvester turns toward the mid-course work position.

If a common tangent of the interruption turning circle and the entry turning circle can be detected for a predetermined length or longer without contact between the interruption turning circle and the entry turning circle, the mid-course work route generation unit 63 generates the mid-course work route by connecting the interruption turning circle and the entry turning circle by the common tangent.

For example, as shown in FIG. 4, an example is given where when an interruption route Rb1 and the interruption position E1 are detected from the travel route P1 of the whirl reaping set in the non-reaped region A1 of the field F1, the mid-course work route is generated. In this example, if the mid-course work position M1a is on the right side of the travel direction of the combine harvester 1 at the interruption position E1, the mid-course work route generation unit 63 sets a clockwise interruption turning circle B1a and sets the counterclockwise entry turning circle C1a since the headland H1 is on the right side of the travel direction of the combine harvester 1 at the mid-course work position M1a. Since the interruption turning circle B1a does not contact the entry turning circle C1a and a common tangent G1a for a predetermined length or longer can be detected between the interruption turning circle B1a and the entry turning circle C1a, the mid-course work route generation unit 63 generates a mid-course work route Q1a by connecting the interruption turning circle B1a and the entry turning circle C1a by the common tangent G1a.

In this example, if the mid-course work position M1b is on the left side of the travel direction of the combine harvester 1 at the interruption position E1, the mid-course work route generation unit 63 sets a counterclockwise interruption turning circle B1b and sets the counterclockwise entry turning circle C1b since the headland H1 is on the right side of the travel direction of the combine harvester 1 at the mid-course work position M1b. Since the interruption turning circle B1b does not contact the entry turning circle C1b and a common tangent G1b for a predetermined length or longer can be detected between the interruption turning circle B1b and the entry turning circle C1b, the mid-course work route generation unit 63 generates a mid-course work route Q1b by connecting the interruption turning circle B1b and the entry turning circle C1b by the common tangent G1b.

If there is a non-reaped region on the mid-course work route, the mid-course work route generation unit 63 sets an avoidance turning circle at the periphery of a tip or the like of the non-reaped region. Then, the mid-course work route generation unit 63 regenerates the mid-course work route by connecting the interruption turning circle and the avoidance turning circle by the common tangent as well as by connecting the avoidance turning circle and the entry turning circle by the common tangent.

For example, as shown in FIG. 5, an example is given where when the interruption route Rb2 and the interruption position E2 are detected from the travel route P2 of the reciprocating reaping set in the non-reaped region A2 of the field F2, the mid-course work route is generated. In this example, if the mid-course work position M2a or M2b is on the left side of the travel direction of the combine harvester 1 at the interruption position E2, the mid-course work route generation unit 63 sets a counterclockwise interruption turning circle B2 and sets the counterclockwise entry turning circle C2a or C2b since the headland H2 is on the left side of the travel direction of the combine harvester 1 at the mid-course work position M2a or M2b. Since a common tangent G2a for a predetermined length or longer can be detected between the interruption turning circle B2a and the entry turning circle C2a, the mid-course work route generation unit 63 generates a mid-course work route Q2a by connecting the interruption turning circle B2 and the entry turning circle C2a by the common tangent G2a.

Alternatively, if the non-reaped region A2 exists on the common tangent G2b with a predetermined length or longer between the interruption turning circle B2 and the entry turning circle C2b, the avoidance turning circle Y2 is set at the tip of the non-reaped region A2 that exists outside the common tangent G2b. Then, the mid-course work route generation unit 63 generates the mid-course work route Q2b by connecting the interruption turning circle B2 and the avoidance turning circle Y2 by the common tangent G2c as well as by connecting the avoidance turning circle Y2 and the entry turning circle C2b by the common tangent G2d.

Alternatively, the mid-course work route generation unit 63 may generate the mid-course work route Q2b so as to avoid an obstructing non-reaped region A2 by adjusting the turning radius of the interruption turning circle B2 or the entry turning circle C2b without setting the avoidance turning circle Y2.

This makes it easy to generate a mid-course work route that efficiently avoids the non-reaped region by connecting the avoidance turning circle based on the non-reaped region and the interruption turning circle at the interruption position or the entry turning circle at the mid-course work position by straight lines, even if the non-reaped region is on the straight line connecting the interruption position (or interruption turning circle) and the mid-course work position (or entry turning circle).

If the interruption turning circle contacts the entry turning circle and the common tangent of the interruption turning circle and the entry turning circle cannot be detected, the mid-course work route generation unit 63 accepts a selection of an entry pattern to the mid-course work position.

Figure 8:
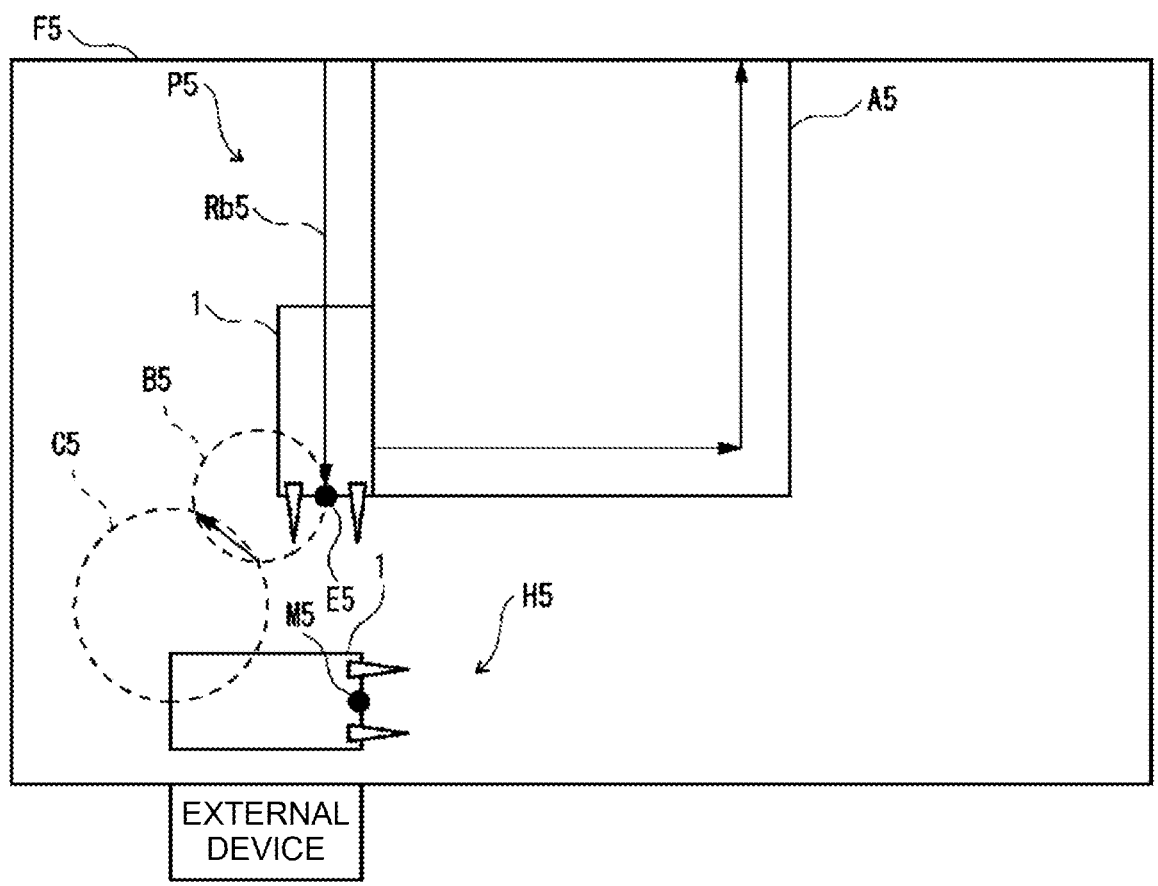
FIG. 8 is a plan view illustrating an example of a field in which an interruption turning circle at the interruption position contacts an entry turning circle at the mid-course work position in the combine harvester according to the embodiment of the present invention.

For example, as shown in FIG. 8, an example is given where when an interruption route Rb5 and the interruption position E5 are detected from the travel route P5 of the whirl reaping set in the non-reaped region A5 of the field F5, the mid-course work route is generated. In this example, if the mid-course work position M5 is on the right side of the travel direction of the combine harvester 1 at the interruption position E5, the mid-course work route generation unit 63 sets a clockwise interruption turning circle B5 and sets the counterclockwise entry turning circle C5 since the headland H5 is on the right side of the travel direction of the combine harvester 1 at the mid-course work position M5. Since the interruption turning circle B5 contacts the entry turning circle C5 and a common tangent with a predetermined length or longer cannot be detected between the interruption turning circle B5 and the entry turning circle C5, the mid-course work route generation unit 63 accepts the selection of an entry pattern.

The mid-course work route generation unit 63 transmits a request for selection of an entry pattern to the portable terminal 53 and receives the selection information of the entry pattern from the portable terminal 53. Then, The mid-course work route generation unit 63 generates a mid-course work route based on the received entry pattern selection information.

Figure 9:
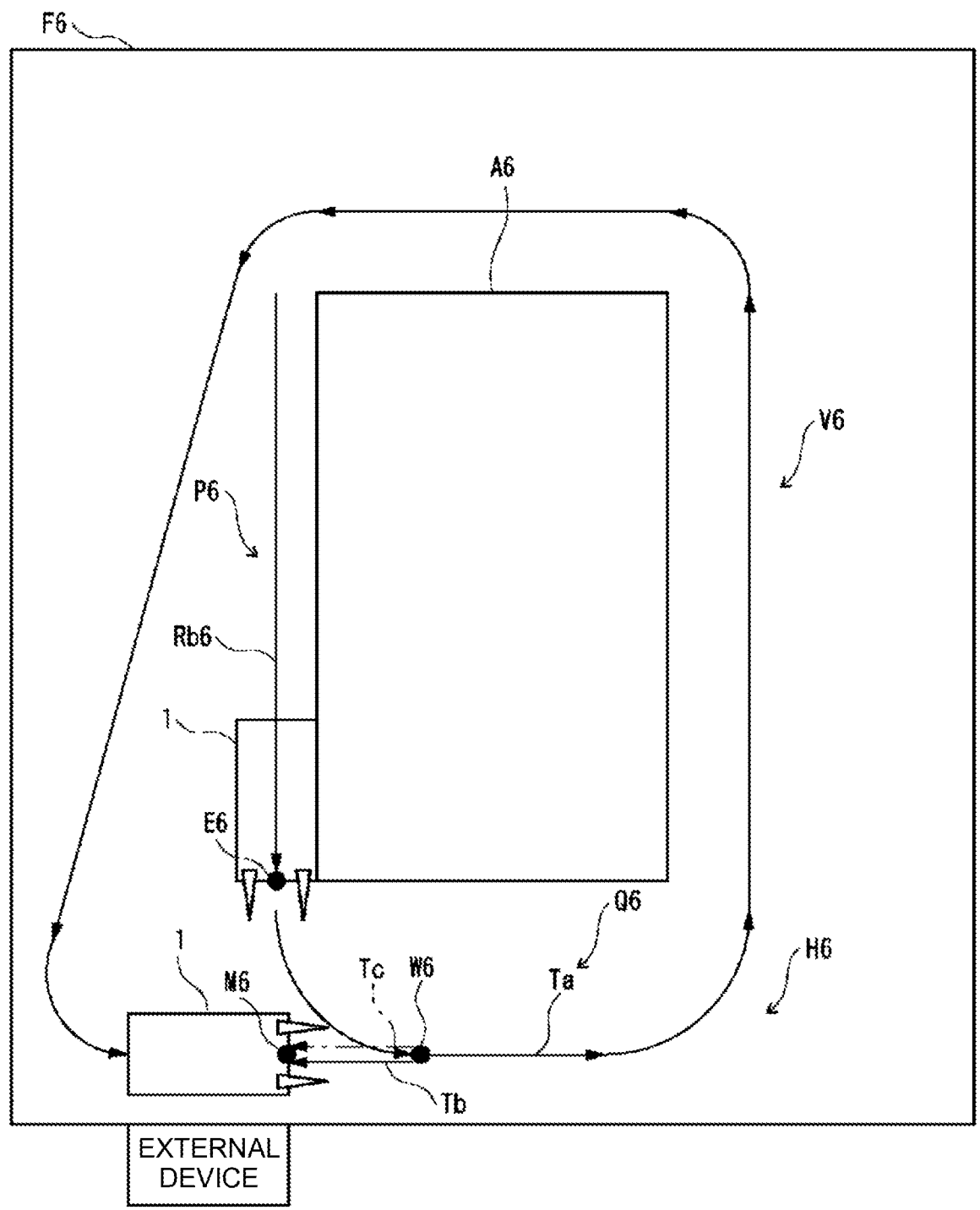
FIG. 9 is a plan view illustrating an example of a field in which a pattern of entry into the mid-course work position is selected in the combine harvester according to the embodiment of the present invention.

For example, as shown in FIG. 9, an example is given where when the combine harvester is stopped at an interruption route Rb6 and an interruption position E6 of a travel route P6 for the non-reaped region A6 of the field F6, an entry pattern is selected. In this example, the mid-course work route generation unit 63 can select any one of the following patterns: a first entry pattern Ta, in which the combine harvester goes around the reaped region V6 along the periphery of the non-reaped region A6 and then advances to the mid-course work position M6 in the headland H6 to enter; a second entry pattern Tb, in which the combine harvester automatically retreats and enters from the side of an exit direction of the mid-course work position M6; and a third entry pattern Tc, in which the combine harvester manually retreats and enters from the side of the exit direction of the mid-course work position M6. For example, The mid-course work route generation unit 63 generates a mid-course work route Q6 so that the combine harvester moves from the interruption position E6 to a predetermined standby position W6 on the side of the exit direction of the mid-course work position M6 and the selected entry pattern is applied from the standby position W6. The mid-course work route generation unit 63 may send a request for selection of an entry pattern to the portable terminal 53 when the combine harvester 1 is at either the interruption position E6 or the standby position W6.

The mid-course work route generation unit 63 may generate the mid-course work route at the same timing as the interruption position setting by the position setting unit 62. Alternatively, the mid-course work route generation unit 63 may generate the mid-course work route upon or before the combine harvester reaches the interruption position by the automatic reaping travel after the interruption position is set by the position setting unit 62.

Furthermore, the mid-course work route generation unit 63 generates a resumption route from the mid-course work position toward a resumption position set by the position setting unit 62 after completion of the mid-course work in order to resume the automatic reaping travel. The resumption route includes a travel setting related to traveling.

The mid-course work route generation unit 63 transmits data on the generated resumption route to the portable terminal 53 and causes the touch panel to display it as well as notifies the operator that the mid-course work is finished and the automatic reaping travel is resumed. The mid-course work route generation unit 63 may transmit data on the resumption route data along with data on the abovementioned mid-course work route data. The display of the resumption route by the portable terminal 53 may end when the movement to the resumption position is completed. Even if the combine harvester starts traveling manually to the resumption position without starting a resumption travel of the resumption route, or if the combine harvester switches a travel mode to a manual travel in the middle of the resumption travel of the resumption route, the display of the resumption route by portable terminal 53 continues until the resumption position is reached, thereby returning to resumption travel of the resumption route.

For example, the mid-course work route generation unit 63 sets an exit turning circle with a predetermined turning radius along which the combine harvester travels while turning from the mid-course work position and a resumption turning circle with a predetermined turning radius along which the combine harvester travels while turning toward the resumption position, and generates a resumption route by connecting the exit turning circle and the resumption turning circle by a straight line. The turning radius of the exit turning circle and the turning radius of the resumption turning circle may be initially set to a predetermined minimum turning radius value (i.e., turning radius threshold) as an initial value and then vary depending on the width of the headland between the exit turning circle and the resumption turning circle. For example, the wider the width of the headland is, the larger the turning radius may be. The exit turning circle is set as a circle whose tangent is a virtual line extending in the travel direction of the combine harvester 1 when the combine harvester performs the mid-course work at the mid-course work position (i.e., a virtual line aligned with a linear route exiting from the mid-course work position).

The resumption turning circle is set as a circle whose tangent is a virtual line extending in the travel direction of the combine harvester 1 when the combine harvester performs the automatic reaping travel at the resumption position (i.e., a virtual line aligned with a linear route entering the resumption position). If there is the headland on the right side of the travel direction of the combine harvester 1 at the mid-course work position, a counterclockwise exit turning circle is set. If the mid-course work position is on the right side with respect to the virtual line in the travel direction of the combine harvester 1 at the resumption position, a clockwise resumption turning circle is set. If the mid-course work position is on the left side with respect to the virtual line in the travel direction of the combine harvester 1 at the resumption position, a counterclockwise resumption turning circle is set.

For example, as shown in FIG. 6, an example is given where when a resumption route Rc3 and a resumption position D3 are set subsequent to an interruption route Rb3, the resumption route is generated. In this example, since the headland H3 is on the right side of the travel direction of the combine harvester 1 at the mid-course work position M3, the mid-course work route generation unit 63 sets the counterclockwise exit turning circle 13. Since the mid-course work position M3 is on the right side of the travel direction of the combine harvester 1 at the resumption position D3, the mid-course work route generation unit 63 sets the clockwise resumption turning circle J3. The mid-course work route generation unit 63 generates a resumption route U3 by connecting the exit turning circle 13 and the resumption turning circle J3 by a common tangent G3.

As shown in FIG. 7, an example is given where when a resumption route Rc4 and a resumption position D4 are set at the closest route from a mid-course work position M4, the resumption route is generated. In this example, since the headland H4 is on the right side of the travel direction of the combine harvester 1 at the mid-course work position M4, the mid-course work route generation unit 63 sets the counterclockwise exit turning circle 14. Since the mid-course work position M4 is on the left side of the travel direction of the combine harvester 1 at the resumption position D4, the mid-course work route generation unit 63 sets the clockwise resumption turning circle J4. The mid-course work route generation unit 63 generates a resumption route U4 by connecting the exit turning circle 14 and the resumption turning circle J4 by a common tangent G4.

The mid-course work route generation unit 63 may generate the resumption route at the same timing as the mid-course work route is generated. Alternatively, after the resumption position is set by the position setting unit 62, the mid-course work route generation unit 63 may generate the resumption route before the combine harvester reaches the mid-course work position, while the combine harvester is performing the mid-course work, or after the combine harvester finishes the mid-course work.

Based on the travel setting and work setting for the travel route generated by the travel route generation unit 61, an automatic drive control unit 64 controls the power unit 8 as well as the traveling part 2 and the reaping part 3 to execute autonomous travel and automatic reaping according to the travel route. The automatic drive control unit 64 allows the reaping part 3 to automatically reap non-reaped grain culms on the travel route. In response to the automatic reaping, the automatic drive control unit 64 controls the threshing part 4, the sorting part 5, the accumulation part 6, and the discharged straw processing part 7 to automatically perform threshing grain culms after reaped, sorting the grains and straw waste after threshed, storing the grains after sorted, and processing the discharged straw after threshed, respectively. The combine harvester 1 includes a gyro sensor and an orientation sensor to obtain displacement information and orientation information of the combine harvester 1, and the automatic drive control unit 64 may adjust the autonomous travel of the combine harvester 1 based on the displacement information and the orientation information.

Based on a travel setting of the mid-course work route or the resumption route generated by the mid-course work route generation unit 63, the automatic drive control unit 64 controls the power unit 8 and the traveling part 2 to execute an autonomous travel according to the mid-course work route or the resumption route. Even when the combine harvester is performing the automatic reaping travel along the travel route, the automatic drive control unit 64 switches the automatic reaping travel of the travel route to the mid-course work travel of the mid-course work route when the combine harvester 1 reaches the interruption position set by the position setting unit 62. When the combine harvester 1 reaches the mid-course work position by the mid-course work travel, the automatic drive control unit 64 finishes the mid-course work travel on the mid-course work route. When the combine harvester 1 finishes the mid-course work, the automatic drive control unit 64 controls the autonomous travel so as to perform a resumption travel on the resumption route. When the combine harvester 1 reaches the resumption position by the resumption travel, the automatic drive control unit 64 switches the resumption travel on the resumption route to the automatic reaping travel on the travel route.

Figure 10:
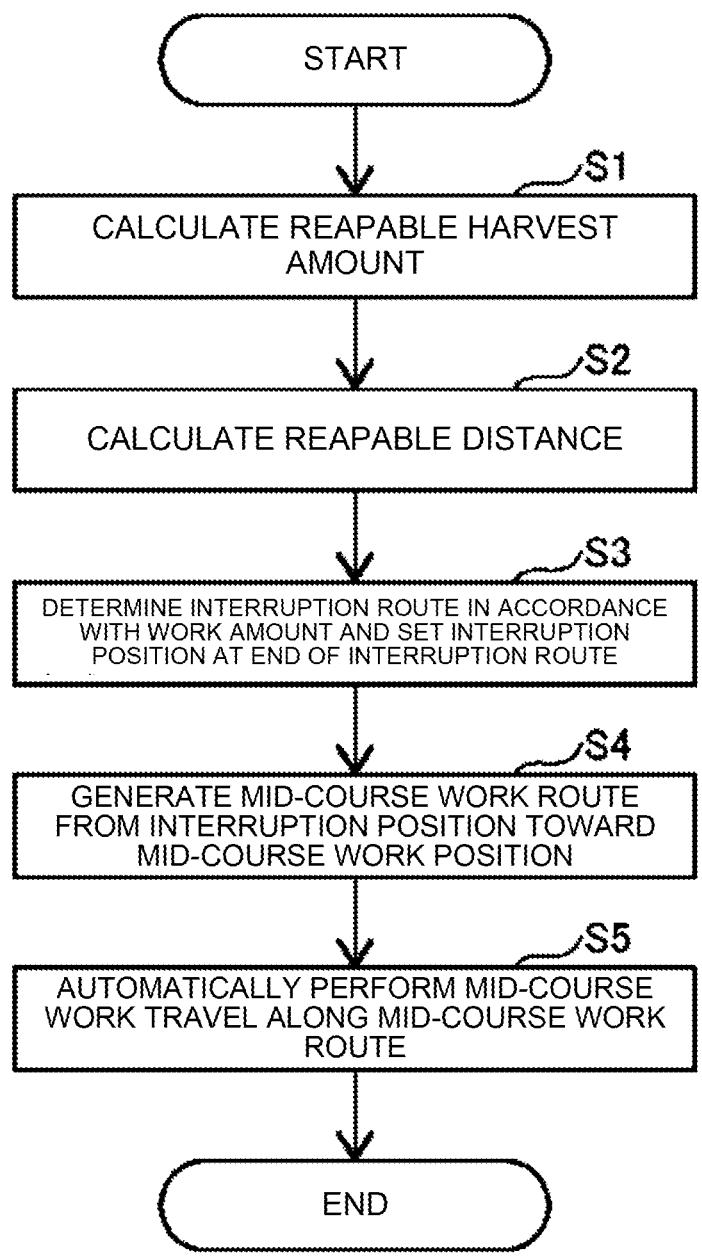
FIG. 10 is a flowchart illustrating a first operation example of generating the interruption position and a mid-course work route in the combine harvester according to the embodiment of the present invention.

Next, with reference to a flowchart shown in FIG. 10, a first example of operation is described where the combine harvester 1 generates an interruption position and a mid-course work route based on the yield of grain.

In the first operation example, the position setting unit 62 first obtains the accumulated harvest amount of grain in the grain tank 23 from the grain sensor 25 at a predetermined timing, and calculates the reapable yield by subtracting the accumulated harvest amount from the set harvest amount (step S1). The position setting unit 62 calculates the unit yield based on the harvest coefficient and calculates the reapable distance by dividing the reapable yield by the unit yield (step S2).

The position setting unit 62 determines the limit route and the limit position based on the calculated reapable distance and the position of the combine harvester 1. The position setting unit 62 determines the interruption route according to a positional relationship between the limit position and the mid-course work position and sets the interruption position at the end of the interruption route (step S3).

Next, the mid-course work route generation unit 63 generates the mid-course work route from the interruption position toward the mid-course work position according to the positional relationship between the interruption position and the mid-course work position set by the position setting unit 62 (step S4).

Next, if the mid-course work route is generated, the automatic drive control unit 64 causes the combine harvester 1 to perform the mid-course work by the autonomous travel from the interruption position to the mid-course work position along the mid-course work route, either in response to operation of the portable terminal 53 or automatically (step S5).

Figure 11:
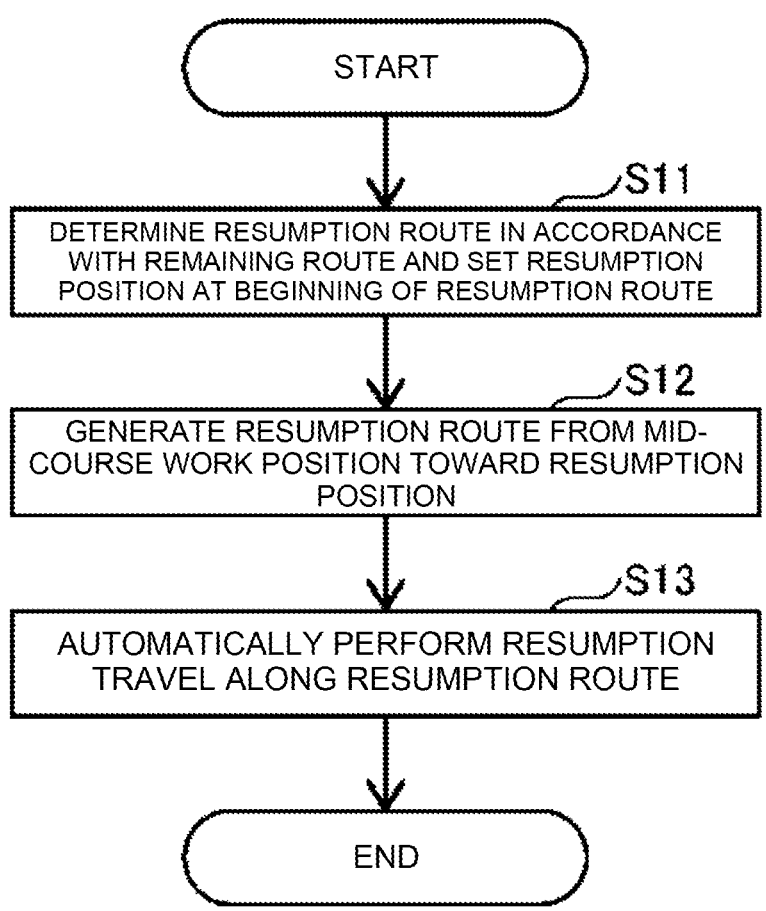
FIG. 11 is a flowchart illustrating a second operation example of generating the resumption position and the resumption route in the combine harvester according to the embodiment of the present invention.

Also, with reference to a flowchart shown in FIG. 11, a second example of operation is described where the combine harvester 1 generates a resumption position and a resumption route after the mid-course work is finished.

In the second operation example, the position setting unit 62 first determines the resumption route based on a positional relationship between a remaining route of the travel route and the interruption route or the mid-course work position at a predetermined timing, and sets the resumption position at the beginning of the resumption route (step S11).

Next, the mid-course work route generation unit 63 generates a resumption route from the mid-course work position toward the resumption position according to the positional relationship between the resumption position and the mid-course work position set by the position setting unit 62 (step S12).

Next, if the resumption route is generated, the automatic drive control unit 64 causes the combine harvester 1 to perform the resumption travel by the autonomous travel from the mid-course work position up to the resumption position along the resumption route, either in response to operation of the portable terminal 53 or automatically (step S13).

As described above, according to the present embodiment, the combine harvester 1 includes the control device 50, and the control device 50 functions as the travel route generation unit 61, the position setting unit 62, the mid-course work route generation unit 63, or the automatic drive control unit 64. The travel route generation unit 61 generates a travel route by combining multiple routes for a non-reaped region of the field. The position setting unit 62 sets an interruption position where the automatic reaping travel is interrupted at the end of a predetermined interruption route based on a workload in order to perform the mid-course work at the mid-course work position according to the workload of the reaping travel. The mid-course work route generation unit 63 generates a mid-course work route from the interruption position toward the mid-course work position in order to perform a mid-course work. The automatic drive control unit 64 controls the autonomous travel or the automatic reaping according to the travel route or the mid-course work route.

This makes it possible to reduce the mid-course work route from the interruption position toward the mid-course work position from overlapping the non-reaped region since the interruption position is provided at the end of the interruption route with respect to the combine harvester 1. In addition, the distance between the interruption position and the mid-course work position can be shortened. As a result, it is possible to move to the mid-course work position and perform the mid-course work smoothly, and thereby shortening a time until the automatic reaping travel is finished.

In this way, it is possible to interrupt an automatic reaping travel at an appropriate position with respect to a mid-course work position and perform an automatic reaping travel and a mid-course work smoothly.

In the combine harvester 1 of the present embodiment, the position setting unit 62 sets as an interruption route a route in which a travel direction is on the side of the headland where the mid-course work position is provided.

This makes it possible to more reliably reduce the mid-course work route from the interruption position toward the mid-course work position from overlapping the non-reaped region. In addition, since the combine harvester is interrupted when the mid-course work position approaches, a travel distance without reaping can be shortened compared to the case where the combine harvester is interrupted at a position far from the mid-course work position.

Furthermore, in the combine harvester 1 according to the present embodiment, the position setting unit 62 presets as the mid-course work position to perform the mid-course work a discharge position where the stored grains are discharged, and predicts as the interruption route a route before the limit position where the accumulated harvest amount of grain is full.

This makes it possible to interrupt reaping at a position close to the discharge position before the accumulated harvest amount of grain is full in the combine harvester 1, thereby improving the efficiency of grain discharge operation.

In the combine harvester 1 according to the present embodiment, the mid-course work route generation unit 63 sets the interruption turning circle whose tangent is a linear route entering the interruption position and the entry turning circle whose tangent is a liner route entering the mid-course work position. If the interruption turning circle does not contact the entry turning circle, the mid-course work route generation unit 63 generates the mid-course work route based on the interruption turning circle, the entry turning circle, and the common tangent between the interruption turning circle and the entry turning circle. When the combine harvester 1 reaches the interruption position by the automatic reaping travel, the automatic drive control unit 64 switches the automatic reaping travel of the travel route to the mid-course work travel of the mid-course work route.

This allows the turning to reduce to a minimum, and also makes it easy to generate an efficient mid-course work route only by connecting the turning circles with each other by a straight line.

Furthermore, if the interruption turning circle contacts the entry turning circle, the portable terminal 53 operating the combine harvester 1 according to the present embodiment functions as a selection unit to select, as an entry pattern into the mid-course work position that is applied to the mid-course work route, any one of the following patterns: a first entry pattern, in which the combine harvester goes around the reaped region and then advances to the mid-course work position to enter; a second entry pattern, in which the combine harvester automatically retreats and enters from the side of an exit direction of the mid-course work position; and a third entry pattern, in which the combine harvester manually retreats and enters from the side of the exit direction of the mid-course work position.

This allows the operator to arbitrarily select the mid-course work position according to the field and headland conditions.

In the combine harvester 1 according to the present embodiment, the position setting unit 62 sets as a resumption route a route subsequent to the interruption route or a route closest from the mid-course work position, and sets a resuming position at the beginning of the resumption route in order to resume the automatic reaping travel after the completion of the mid-course work. The mid-course work route generation unit 63 sets the exit turning circle whose tangent is a linear route exiting from the mid-course work position and the resumption turning circle whose tangent is a liner route entering the resumption position, and generates the resumption route based on the exit turning circle, the resumption turning circle, and the common tangent between the exit turning circle and the resumption turning circle. The automatic drive control unit 64 controls the autonomous travel so as to perform the resumption travel of the resumption route after the completion of the mid-course work. When the combine harvester reaches the resumption position by the resumption travel, the automatic drive control unit 64 switches the resumption travel of the resumption route to the automatic reaping travel of the travel route.

This makes it possible to automatically generate the resumption route according to the remaining travel route of the travel route or the positional relationship between the remaining travel route of the travel route and the mid-course work position, thereby returning to the automatic reaping travel smoothly.

Figure 12:
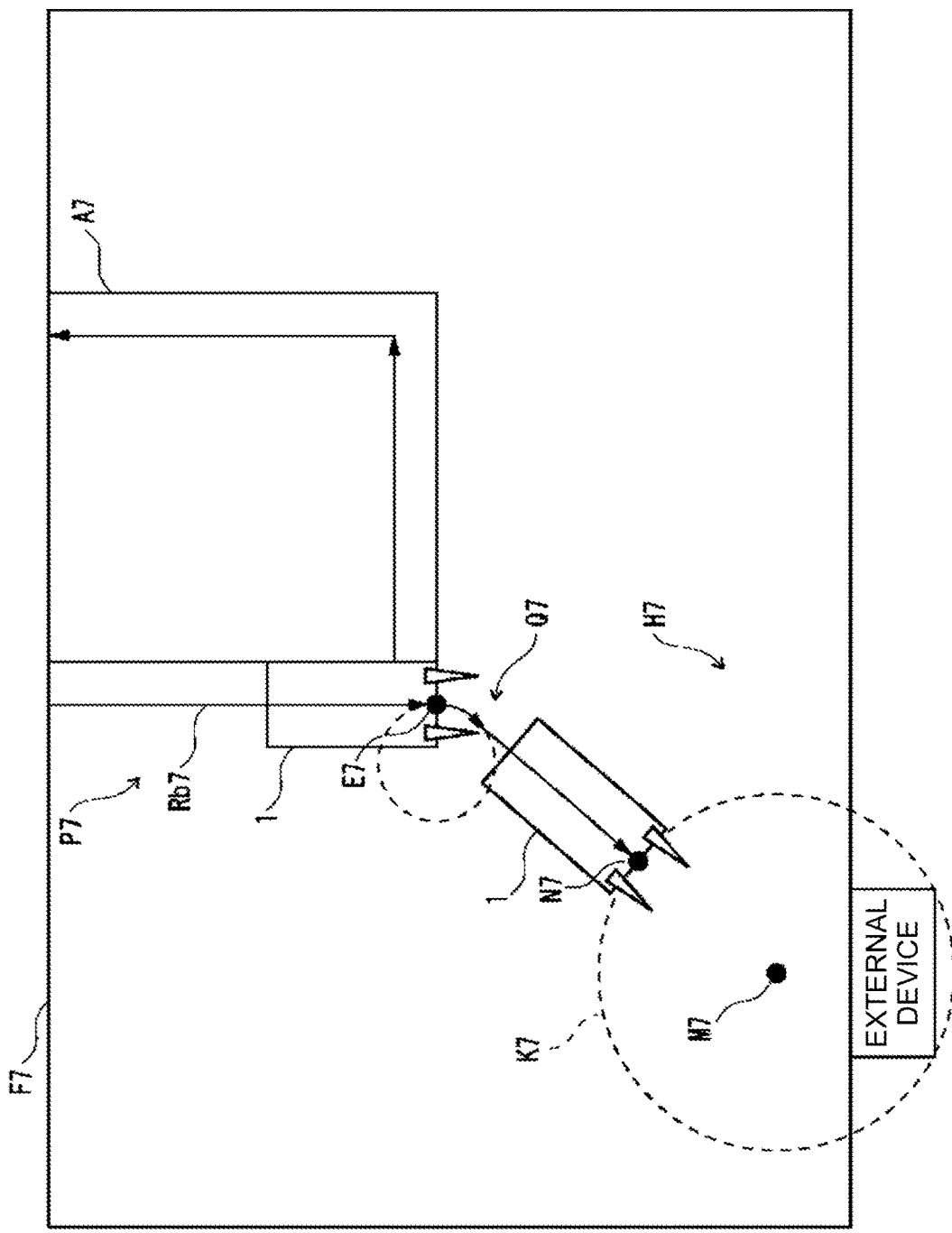
FIG. 12 is a plan view illustrating an example of a field in which the combine harvester stops at a stop area around the mid-course work position in the combine harvester according to the embodiment of the present invention.

In the abovementioned embodiment, an example in which the mid-course work route generation unit 63 in the combine harvester 1 generates a mid-course work route to reach the mid-course work position from the interruption position set by the position setting unit 62, but the present invention is not limited to this example. For example, in other embodiments, the combine harvester 1 sets in advance a predetermined stop area K7 (e.g., area with 5 m in radius) around the mid-course work position M7 of the headland H7 of the field F7 with non-reaped region A7, as shown in FIG. 12. The mid-course work route generation unit 63 tentatively generates a route to reach the mid-course work position M7 from the interruption position E7 in the interruption route Rb7 of the travel route P7, and sets as a stop position N7 a position where the tentative route and the stop area K7 intersect. Then, The mid-course work route generation unit 63 generates a mid-course work route Q7 to reach the stop position N7 from the interruption position E7. The automatic drive control unit 64 causes the combine harvester 1 to perform the mid-course work travel along the mid-course work route Q7 up to the stop position N7. When the combine harvester 1 reaches the stop position N7, the automatic drive control unit 64 transmits a notification of the arrival at the stop position N7 to the portable terminal 53.

Figure 13:
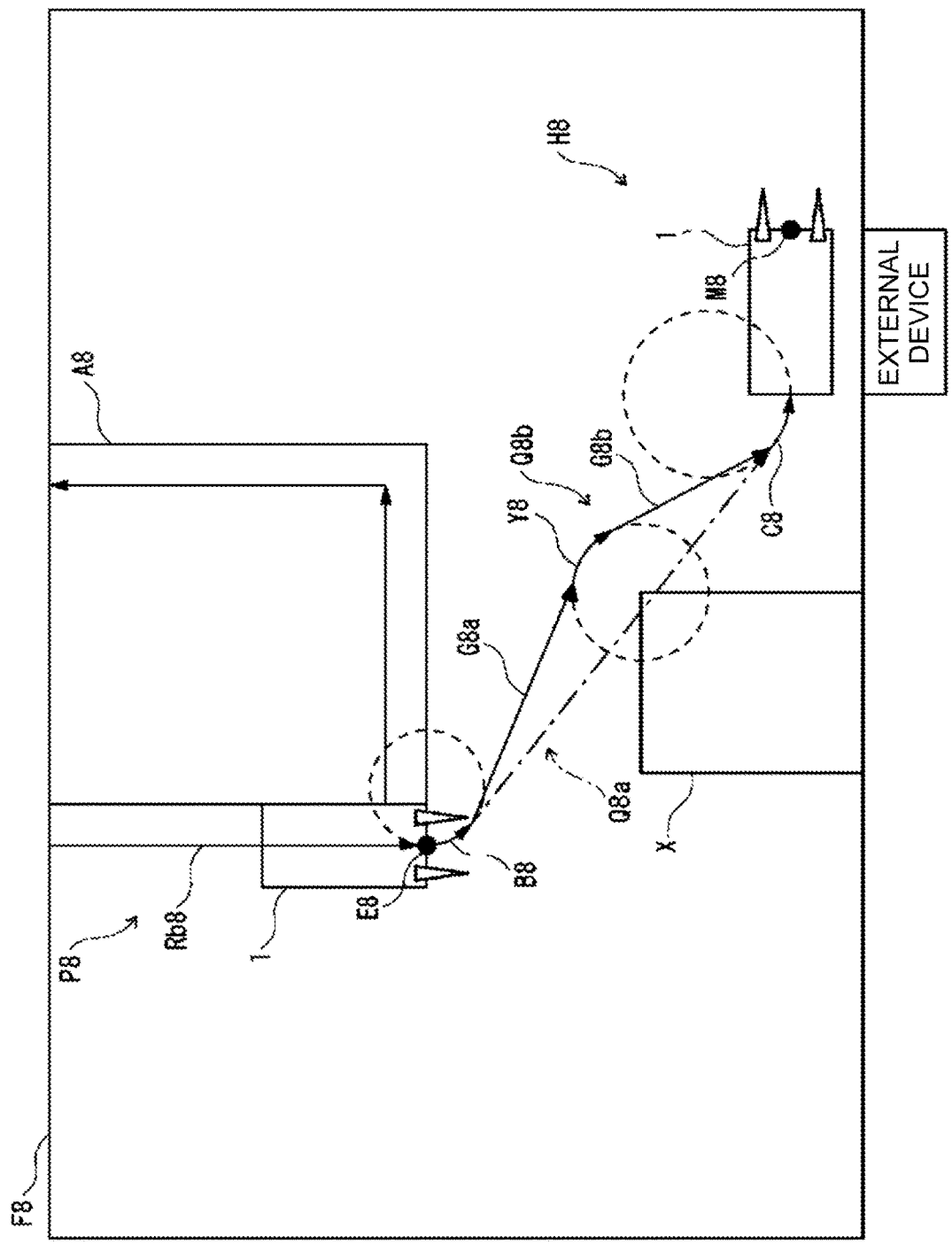
FIG. 13 is a plan view illustrating an example of a field in which an obstacle on the mid-course work route is avoided in the combine harvester according to the embodiment of the present invention.

According to another embodiment, if an obstacle such as the non-reaped region exists on the mid-course work route or resumption route generated by the mid-course work route generation unit 63, the combine harvester 1 regenerates the mid-course work route or the resumption route so as to avoid the obstacle. For example, as shown in FIG. 13, there may be an obstacle X in the vicinity of the mid-course work position M8 in the headland H8 of the field F8 with the non-reaped region A8. The combine harvester 1 detects the obstacle X and its position information based on field images from the onboard camera 32, the fixed camera 43, the portable camera 54 or the aerial imaging camera 57, and field information input according to operation of the portable terminal 53.

At this time, the position setting unit 62 sets the interruption route Rb8 and the interruption position E8 from the travel route P8 according to the workload of the combine harvester 1, regardless of the obstacle X. The mid-course work route generation unit 63 generates a mid-course work route Q8a from the interruption position E8 toward the mid-course work position M8, regardless of the obstacle X.

When the obstacle X exists on the mid-course work route Q8a, the mid-course work route generation unit 63 sets an avoidance turning circle Y8 on the periphery of the obstacle X, e.g., on the periphery of a tip or the like of the obstacle X that protrudes from the mid-course work route Q8a to the inside of the field F8. Then, the mid-course work route generation unit 63 connects the interruption turning circle B8 and the avoidance turning circle Y8 by the common tangent G8a as well as connects the avoidance turning circle Y8 and the entry turning circle C8 by the common tangent G8b, to regenerate the mid-course work route Q8b.

Alternatively, the mid-course work route generation unit 63 may regenerate the mid-course work route so as to avoid the obstacle by adjusting the turning radius of the interruption turning circle or the entry turning circle without setting the avoidance turning circle, or may regenerate the resumption route so as to avoid the obstacle by adjusting the turning radius of the exit turning circle or the resumption turning circle.

Also when generating the resumption route, if there is the obstacle on the resumption route, the mid-course work route generation unit 63 regenerates the resumption route so as to avoid the obstacle in the same way as when generating the mid-course work route.

As described above, in the combine harvester 1 according to the present embodiment, if there is the obstacle on the generated mid-course work route, the mid-course work route generation unit 63 sets the avoidance turning circle to avoid the obstacle and regenerates the mid-course work route by connecting the interruption turning circle and the avoidance turning circle by the common tangent of the interruption turning circle and the avoidance turning circle as well as connecting the avoidance turning circle and the entry turning circle by the common tangent of the avoidance turning circle and the entry turning circle.

This makes it possible to easily generate the mid-course work route that efficiently avoids the obstacle even when there is the obstacle on the mid-course work route, by connecting the avoidance turning circle based on the obstacle and the interruption turning circle at the interruption position and the entry turning circle at the mid-course work position by a straight line.

Furthermore, in the combine harvester 1 according to the present embodiment, if there is the obstacle on the generated resumption route, the mid-course work route generation unit 63 sets the avoidance turning circle to avoid the obstacle and regenerates the resumption route by connecting the exit turning circle and the avoidance turning circle by the common tangent of the exit turning circle and the avoidance turning circle as well as connecting the avoidance turning circle and the resumption turning circle by the common tangent of the avoidance turning circle and the resumption turning circle.

This makes it possible to easily generate the resumption route that efficiently avoids the obstacle even when there is the obstacle on the mid-course work route, by connecting the avoidance turning circle based on the obstacle and the exit turning circle at the mid-course work position and the resumption turning circle at the resumption position by a straight line.

In the above mentioned embodiment, an example in which the control device 50 of the combine harvester 1 functions as the field information setting unit 60, the travel route generation unit 61, the position setting unit 62, the mid-course work route generation unit 63, and automatic drive control unit 64, but the present invention is not limited to this example. For example, in another embodiment, the portable terminal 53 may be configured to function as the field information setting unit 60, the travel route generation unit 61, the position setting unit 62, the mid-course work route generation unit 63, or the automatic drive control unit 64. For example, the portable terminal 53 may calculate the reapable distance according to the workload such as the accumulated harvest amount of grain in the grain tank 23, the reapable yield, or the remaining amount of fuel in the fuel tank 27. The portable terminal 53 may set the interruption route and the interruption position according to the reapable distance. Furthermore, the portable terminal 53 may generate the mid-course work route according to the interruption position and generate the resumption route according to the remaining route.

In the embodiments described above, an example of the combine harvester 1 configured as a head-feeding combine harvester is described. However, the present invention is not limited to this example, and the combine harvester 1 may be configured as an ordinary-type combine harvester. In the embodiments described above, FIG. 7 illustrates an example of turning the empty travel route between routes with a U-turn, but the present invention is not limited to this example, and the empty travel route between routes may be turned with other turning methods such as a fishtail turn.

It should be noted that the present invention can be properly modified to the extent that it does not contradict the invention's gist or idea that can be read from the claims and the entire specification, and the combine harvester and the automatic driving method with the above modification are also included in the technical concept of the present invention.

DESCRIPTION OF REFERENCE NUMERALS

1 Combine harvester
2 Traveling part
3 Reaping part
25 Grain sensor
28 Fuel sensor
34 Mobile station
39 Base station
50 Control device
51 Storage unit
52 Communication unit
53 Portable terminal
60 Field information setting unit
61 Travel route generation unit
62 Position setting unit
63 Mid-course work route generation unit
64 Automatic drive control unit

The invention claimed is:

1. A combine harvester for performing an automatic reaping travel along a travel route, the combine harvester comprising:
   a travel route generation unit configured to combine a plurality of routes for a non-reaped region of a field to generate the travel route;
   a position setting unit configured to set an interruption position where the automatic reaping travel is interrupted based on a workload at the end of a predetermined interruption route in order to perform a mid-course work according to the workload of a reaping travel at a predetermined mid-course work position;
   a mid-course work route generation unit configured to generate a mid-course work route from the interruption position toward the mid-course work position in order to perform the mid-course work; and
   an automatic drive control unit configured to control an autonomous travel or an automatic reaping according to the travel route or the mid-course work route.

2. The combine harvester according to claim 1, wherein the position setting unit is further configured to set as the interruption route a route in which a travel direction is on the side of a headland where the mid-course work position is provided.

3. The combine harvester according to claim 2, wherein the position setting unit is further configured to:
   set in advance as the mid-course work position to perform the mid-course work a discharge position where stored grains are discharged; and
   predict as the interruption route a route before a limit position where an accumulated harvest amount of grain is full.

4. The combine harvester according to claim 1, wherein:
   the mid-course work route generation unit is further configured to:
      set an interruption turning circle whose tangent is a linear route entering the interruption position and an entry turning circle whose tangent is a linear route entering the mid-course work position; and
      generate the mid-course work route based on the interruption turning circle, the entry turning circle, and a common tangent between the interruption turning circle and the entry turning circle when the interruption turning circle does not contact the entry turning circle, and
   the automatic drive control unit is further configured to switch the automatic reaping travel of the travel route to a mid-course work travel of the mid-course work route based on the combine harvester reaching the interruption position by the automatic reaping travel.

5. The combine harvester according to claim 4, further comprising:
   a selection unit configured to select, as an entry pattern into the mid-course work position that is applied to the mid-course work route when the interruption turning circle contacts the entry turning circle, one of:
      a first entry pattern in which the combine harvester is configured to go around a reaped region and then advance to the mid-course work position to enter;
      a second entry pattern in which the combine harvester is configured to automatically retreat and enter from the side of an exit direction of the mid-course work position; and a third entry pattern in which the combine harvester is configured to manually retreat and enter from the side of the exit direction of the mid-course work position.

6. The combine harvester according to claim 1, wherein; the position setting unit is further configured to:
set, as a resumption route, a route subsequent to the interruption route or a route closest to the mid-course work position, and
set a resuming position to resume the automatic reaping travel at the beginning of the resumption route in order to resume the automatic reaping travel after completion of the mid-course work,
the mid-course work route generation unit is further configured to:
set an exit turning circle whose tangent is a linear route exiting from the mid-course work position and a resumption turning circle whose tangent is a liner route entering a resumption position, and
generate a resumption route based on the exit turning circle, the resumption turning circle, and a common tangent between the exit turning circle and the resumption turning circle, and
the automatic drive control unit is further configured to:
control an autonomous travel so as to perform a resumption travel of the resumption route after the completion of the mid-course work, and
switch the resumption travel of the resumption route to the automatic reaping travel of the travel route based on the combine harvester reaching the resumption position by the resumption travel.

7. The combine harvester according to claim 4 or 5, wherein, when there is an obstacle on the generated mid-course work route, the mid-course work route generation unit is configured to:
set an avoidance turning circle to avoid the obstacle; and
regenerate the mid-course work route by connecting the interruption turning circle and the avoidance turning circle by a common tangent of the interruption turning circle and the avoidance turning circle as well as connecting the avoidance turning circle and the entry turning circle by a common tangent of the avoidance turning circle and the entry turning circle.

8. The combine harvester according to claim 6, wherein, when there is an obstacle on the resumption route, the mid-course work route generation unit is further configured to:
set an avoidance turning circle to avoid the obstacle; and
regenerate the resumption route by connecting the exit turning circle and the avoidance turning circle by a common tangent of the exit turning circle and the avoidance turning circle as well as connecting the avoidance turning circle and the resumption turning circle by a common tangent of the avoidance turning circle and the resumption turning circle.

9. An automatic drive method of a combine harvester for performing an automatic reaping travel along a travel route, the automatic drive method comprising:
generating the travel route by combining a plurality of routes for a non-reaped region of a field;
setting an interruption position where the automatic reaping travel is interrupted based on a workload at the end of a predetermined interruption route in order to perform a mid-course work according to the workload of a reaping travel at a predetermined mid-course work position;
generating a mid-course work route from the interruption position toward the mid-course work position in order to perform the mid-course work; and
controlling an autonomous travel or an automatic reaping according to the travel route or the mid-course work route.

10. The automatic drive method according to claim 9, further comprising, setting as the interruption route, a route in which a travel direction is on the side of a headland where the mid-course work position is provided.

11. The automatic drive method according to claim 10, further comprising:
setting, in advance, as the mid-course work position to perform the mid-course work a discharge position where stored grains are discharged; and
predicting, as the interruption route, a route before a limit position where an accumulated harvest amount of grain is full.

12. The automatic drive method according to claim 9, wherein:
setting an interruption turning circle whose tangent is a linear route entering the interruption position and an entry turning circle whose tangent is a linear route entering the mid-course work position;
generating the mid-course work route based on the interruption turning circle, the entry turning circle, and a common tangent between the interruption turning circle and the entry turning circle when the interruption turning circle does not contact the entry turning circle; and
switching the automatic reaping travel of the travel route to a mid-course work travel of the mid-course work route when the combine harvester reaches the interruption position by the automatic reaping travel.

13. The automatic drive method according to claim 12, further comprising:
selecting, as an entry pattern into the mid-course work position that is applied to the mid-course work route when the interruption turning circle contacts the entry turning circle, one of:
a first entry pattern in which the combine harvester is configured to go around a reaped region and then advance to the mid-course work position to enter;
a second entry pattern in which the combine harvester is configured to automatically retreat and enter from the side of an exit direction of the mid-course work position; and
a third entry pattern in which the combine harvester is configured to manually retreat and enter from the side of the exit direction of the mid-course work position.

14. The automatic drive method according to claim 9, wherein:
setting, as a resumption route, a route subsequent to the interruption route or a route closest to the mid-course work position, and setting a resuming position to resume the automatic reaping travel at the beginning of the resumption route in order to resume the automatic reaping travel after completion of the mid-course work;
setting an exit turning circle whose tangent is a linear route exiting from the mid-course work position and a resumption turning circle whose tangent is a liner route entering a resumption position, and generating a resumption route based on the exit turning circle, the resumption turning circle, and a common tangent between the exit turning circle and the resumption turning circle;

controlling an autonomous travel so as to perform a resumption travel of the resumption route after the completion of the mid-course work; and switching the resumption travel of the resumption route to the automatic reaping travel of the travel route when the combine harvester reaches the resumption position by the resumption travel.

15. The automatic drive method according to claim 12, further comprising, when there is an obstacle on the generated mid-course work route, route;

setting an avoidance turning circle to avoid the obstacle; and regenerating the mid-course work route by connecting the interruption turning circle and the avoidance turning circle by a common tangent of the interruption turning circle and the avoidance turning circle as well as connecting the avoidance turning circle and the entry turning circle by a common tangent of the avoidance turning circle and the entry turning circle.

16. The automatic drive method according to claim 14, further comprising, when there is an obstacle on the resumption route:

setting an avoidance turning circle to avoid the obstacle; and regenerating the resumption route by connecting the exit turning circle and the avoidance turning circle by a common tangent of the exit turning circle and the avoidance turning circle as well as connecting the avoidance turning circle and the resumption turning circle by a common tangent of the avoidance turning circle and the resumption turning circle.

* * * * *